FIG. 40a

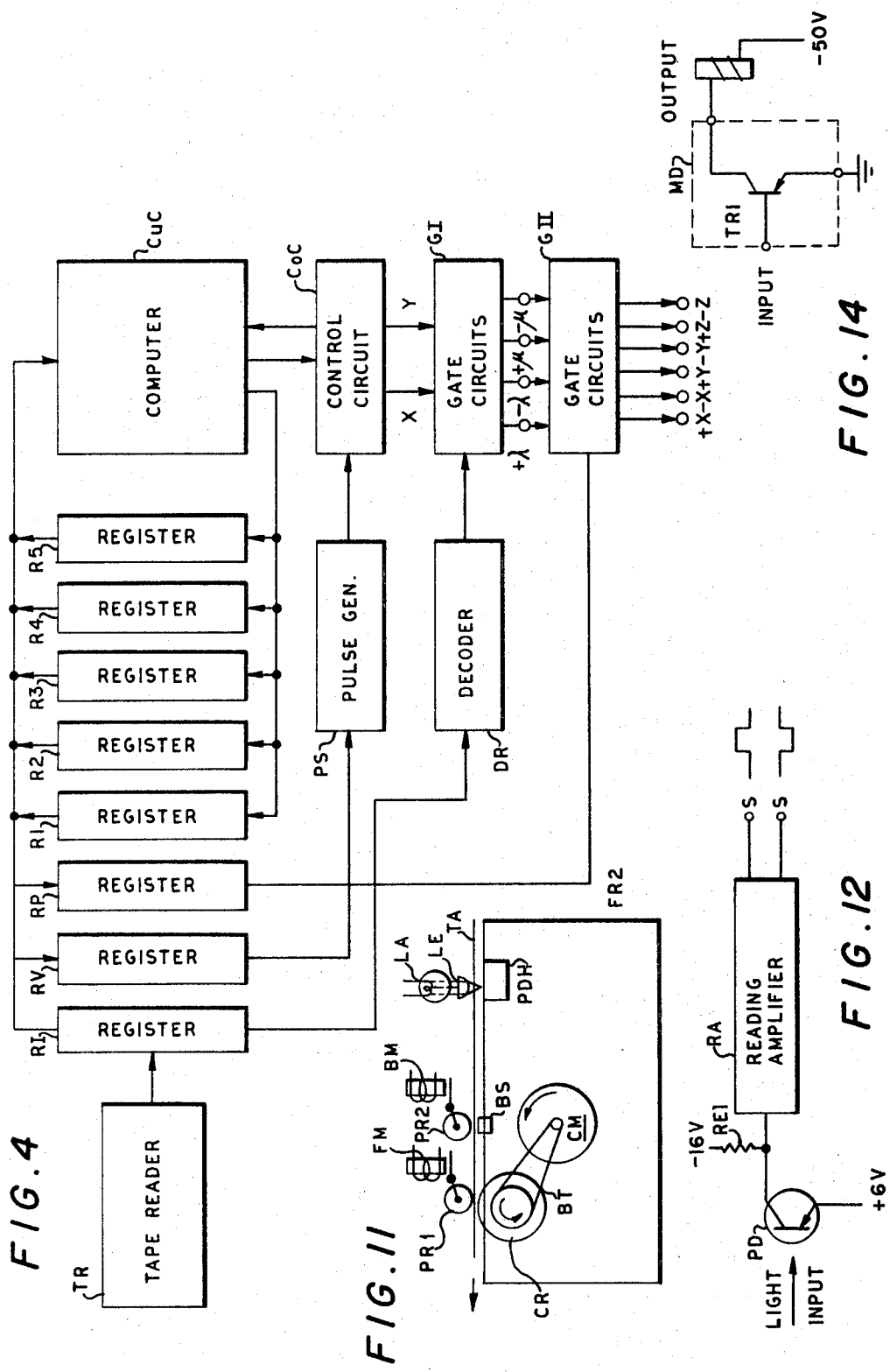

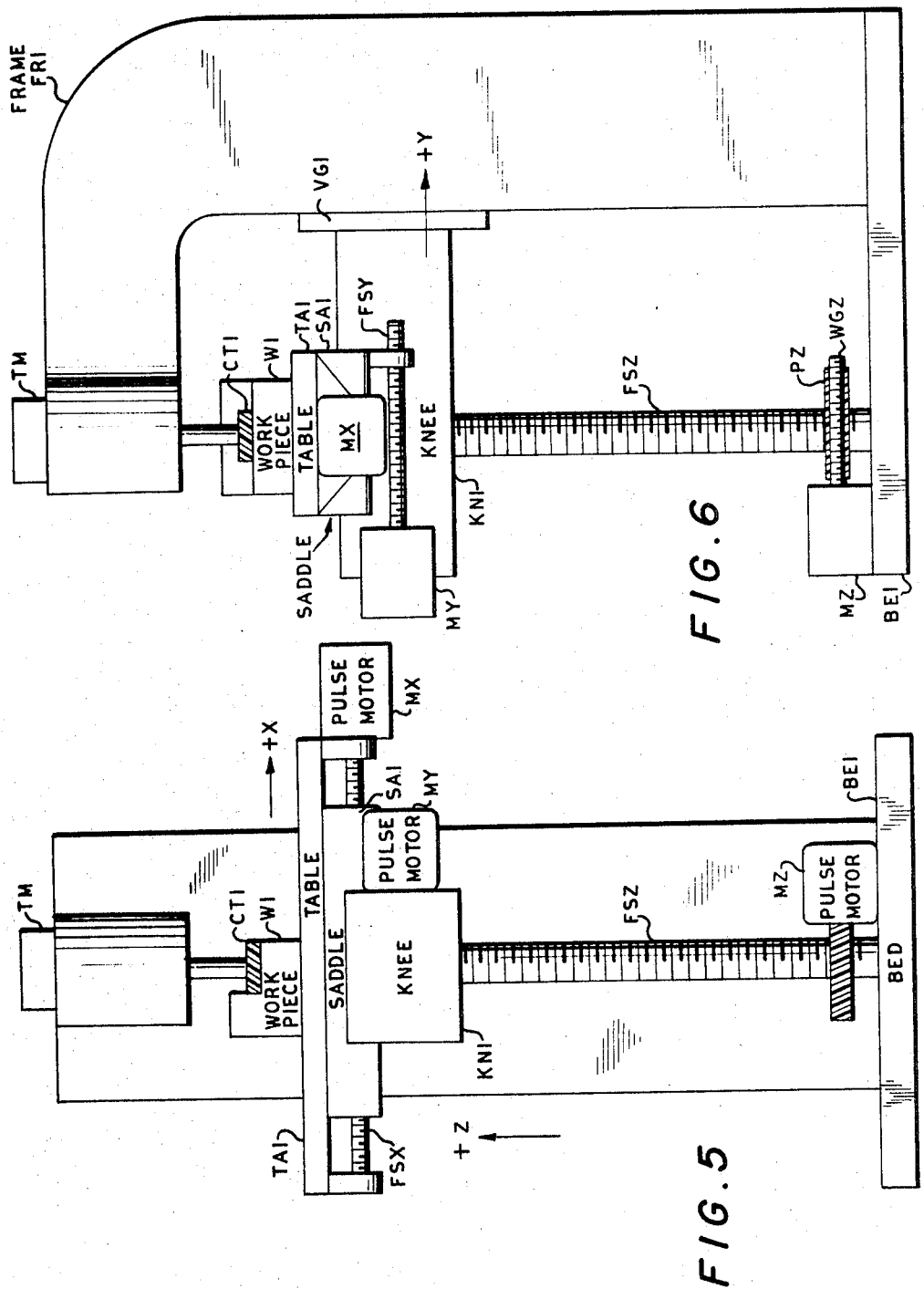

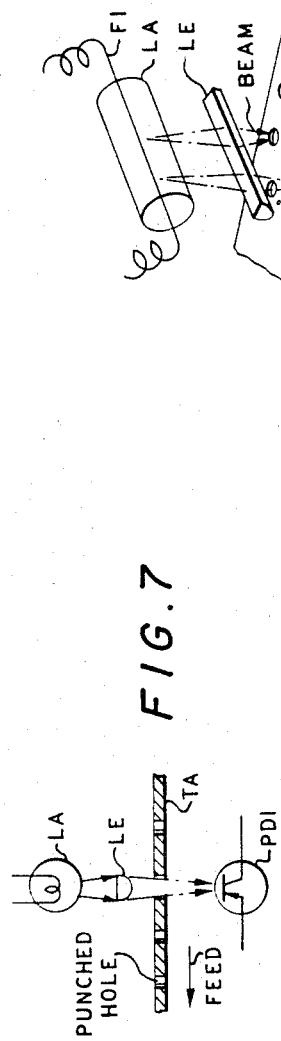

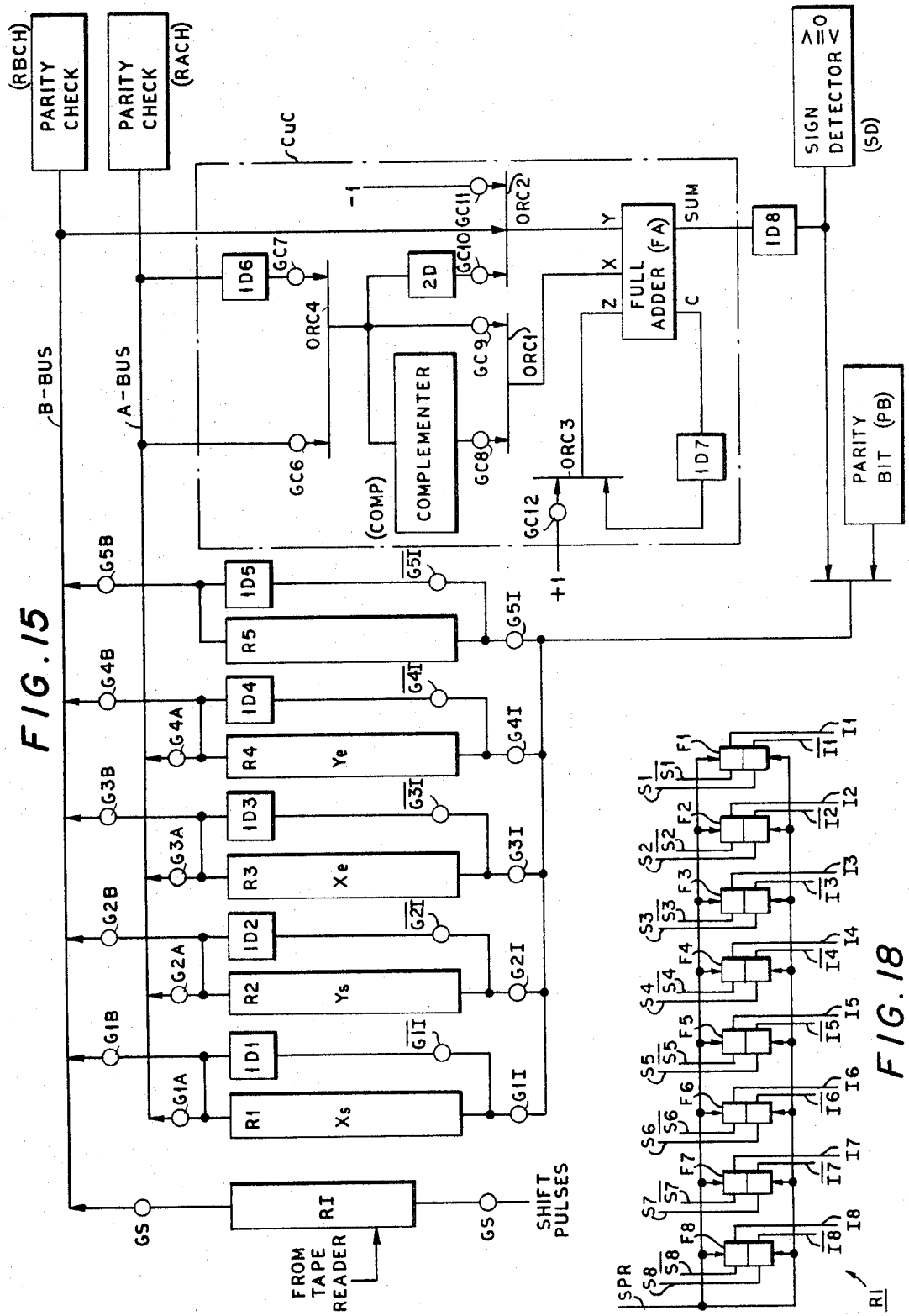

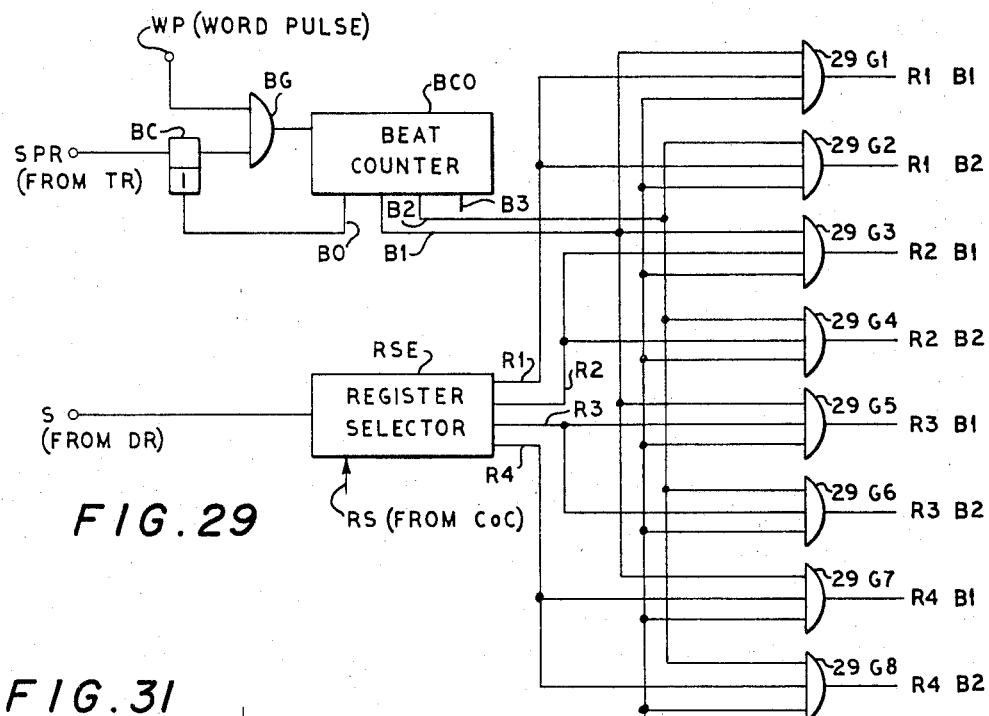
FIG. 29
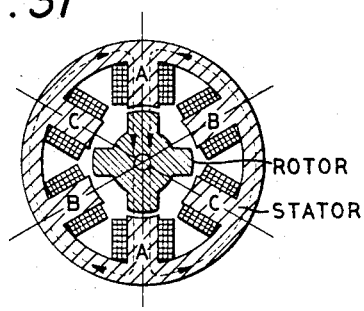
FIG. 31
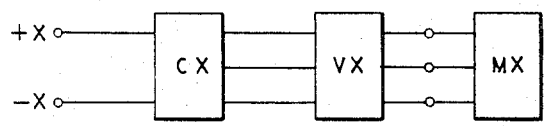
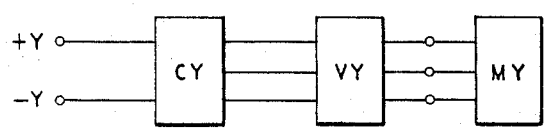
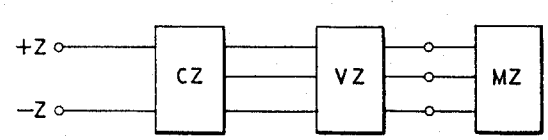
FIG. 32
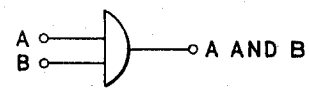
FIG. 19
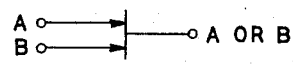
FIG. 20

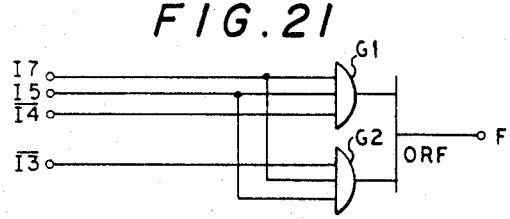
FIG. 21
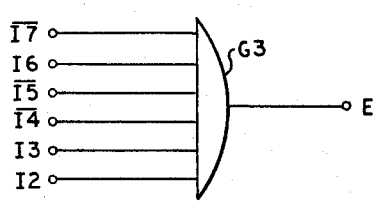
FIG. 22
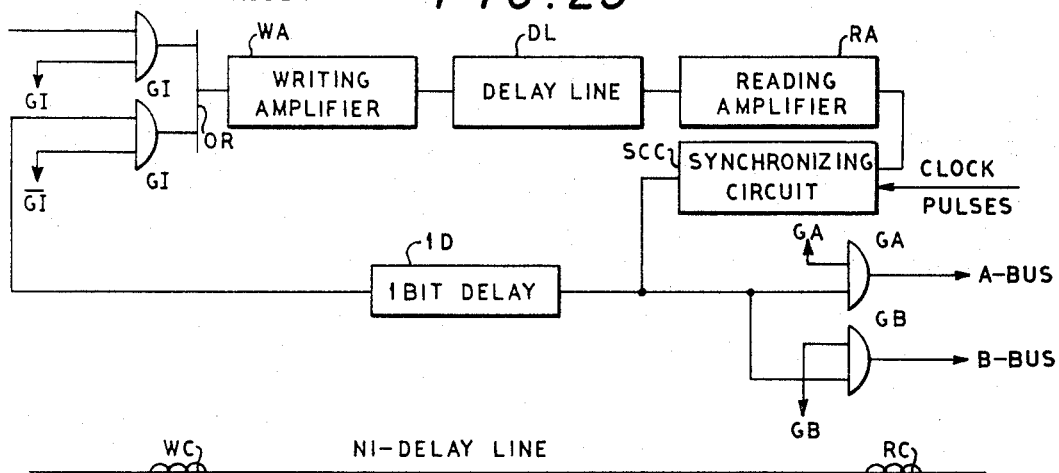
FIG. 25
FIG. 26
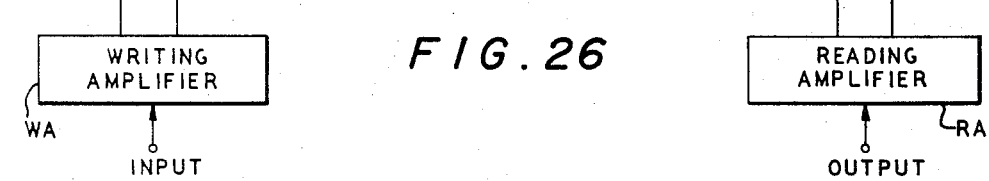
FIG. 30a
FIG. 30b
FIG. 30c
FIG. 30d
FIG. 30e
FIG. 30f
FIG. 30g FIG.36
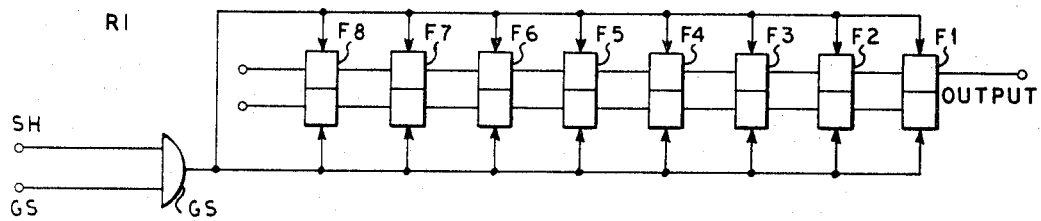
(1) STRAIGHT LINE LN
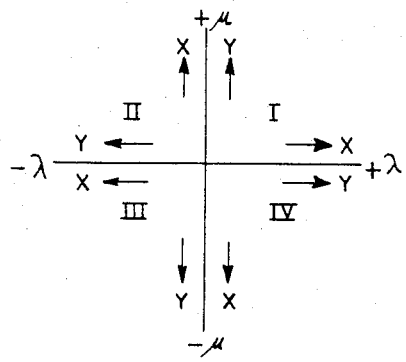
FIG.37
(2) COUNTER-CLOCKWISE ARC AL
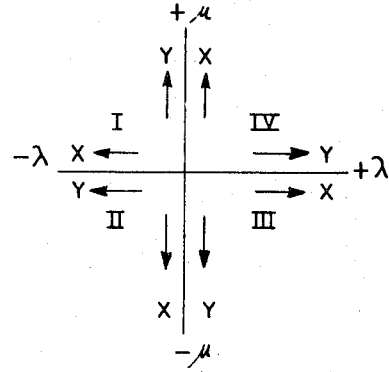
FIG.38
(3) CLOCKWISE ARC AR
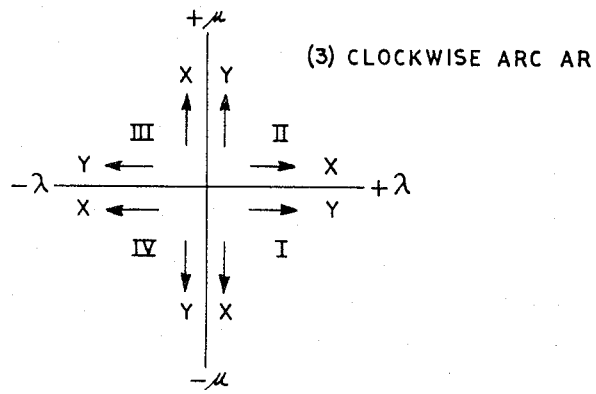
FIG.39

| I8 I7 I6 I5 I4 I3 I2 I1 | | |
|---|---|---|
| O   O O O | E | |
| O O | | A1 |
| O O | | A2 |
| O O | | A3 |
| O O O | AUX | A4 |
| O O | | A5 |
| O O O | | A6 |
| O O O | | A7 |
| O O O O | | A8 |
| O O | | 0 |
| O O | | 1 |
| O O | | 2 |
| O O O O | | 3 |
| O O | N | 4 |
| O O O O | | 5 |
| O O O O | | 6 |
| O O O | | 7 |
| O O | | 8 |
| O O O | | 9 |
| O O O O | S | |

FIG. 40b

| I8 I7 I6 I5 I4 I3 I2 I1 | | |
|---|---|---|
| O O | | V1 |
| O O O O | V | V2 |
| O O O O | | V3 |
| O O O O | | V4 |
| O O | | XY |
| O O O O | P | YZ |
| O O O O | | XZ |
| O O | | I |
| O O O O | AL | II |
| O O O O | | III |
| O O O O | | IV |
| O O O | | I |
| O O O O | F AR | II |
| O O O O | | III |
| O O O O O | | IV |
| O O O O | | I |
| O O O O | LN | II |
| O O O O | | III |
| O O O O O | | IV |

FIG. 41

|   | XY | YZ | XZ |
|---|---|---|---|
| +λ | +X | +Y | +X |
| −λ | −X | −Y | −X |
| +μ | +Y | +Z | +Z |
| −μ | −Y | −Z | −Z |
| | | | |

FIG. 42

| X   | 0 0 1 1 0 0 1 1 |
|-----|-----------------|
| Y   | 0 1 0 1 0 1 0 1 |
| C'  | 0 0 0 0 1 1 1 1 |
| SUM | 0 1 1 0 1 0 0 1 |
| C   | 0 0 0 1 0 1 1 1 |

| | | |
|---|---|---|
| R1B1 | (R1)×10 (1010 BINARY) | ⟶ R1 |
| R1B2 | (R1) + OUTPUT IN FIG.36 | ⟶ R1 |
| R2B1 | (R2)×10 | ⟶ R2 |
| R2B2 | (R2) + OUTPUT IN FIG.36 | ⟶ R2 |
| R3B1 | (R3)×10 | ⟶ R3 |
| R3B2 | (R3) + OUTPUT IN FIG.36 | ⟶ R3 |
| R4B1 | (R4)×10 | ⟶ R4 |
| R4B2 | (R4) + OUTPUT IN FIG.36 | ⟶ R4 |

FIG.44

| | R1B1 | R1B2 | R2B1 | R2B2 | R3B1 | R3B2 | R4B1 | R4B2 |
|---|---|---|---|---|---|---|---|---|
| G1A | O | O | | | | | | |
| G2A | | | O | O | | | | |
| G3A | | | | | O | O | | |
| G4A | | | | | | | O | O |
| G1B | | | | | | | | |
| G2B | | | | | | | | |
| G3B | | | | | | | | |
| G4B | | | | | | | | |
| G1I | O | O | | | | | | |
| G2I | | | O | O | | | | |
| G3I | | | | | O | O | | |
| G4I | | | | | | | O | O |
| G5I | | | | | | | | |
| GC6 | | O | | O | | O | | O |
| GC7 | O | | O | | O | | O | |
| GC8 | | | | | | | | |
| GC9 | O | O | O | O | O | O | O | O |
| GC10 | O | | O | | O | | O | |
| GC11 | | | | | | | | |
| GC12 | | | | | | | | |
| GS | | O | | O | | O | | O |

| | G1A | G2A | G3A | G4A | G1B | G2B | G3B | G4B | G1I | G2I | G3I | G4I | G5I | GC6 | GC7 | GC8 | GC9 | GC10 | GC11 | GC12 | GS |
|---|---|---|---|---|---|---|---|---|---|---|---|---|---|---|---|---|---|---|---|---|---|
| +LN1 | | O | | | | | | | | | | | | | | O | | | | | |
| +LN2 | (R5)−(R4)→R5 | | | | | | | | | | | | | O | | | | | | | |
| +LN3 | (R1)+1→R1 | | | O | | | | | | | | | | O | | O | | | | | |
| −LN1 | (R1)−(R3) | | | O | | | | | | | | | | O | | O | | | | | |
| −LN2 | (R5)+(R3)→R5 | | O | | | | | | | | | | | O | | | O | | | O | |
| −LN3 | (R2)+1→R2 | | | | | O | | | | | | | | O | | | | | | | |
| +A1 | (R2)−(R4) | O | | | | | O | | | O | | | | O | | O | | | O | O | |
| +A2 | (R5)−2(R1)+1→R5 | O | | | O | | | | | | | | O | | O | | | | O | | |
| +A3 | (R1)−1→R1 | O | | | | | | | | | | | | O | | | O | | | | |
| −A1 | (R3)−(R1) | | O | | | | | | | | | | O | O | | | | | | | |
| −A2 | (R5)+2(R2)+1→R5 | | O | | | | | | | | | | | O | O | | O | | | O | |
| −A3 | (R2)+1→R2 | | | | | | | | O | O | | | | O | O | | O | | | O | |
| | (R2)−(R4) | | | | | O | | | | | | | | O | O | | | | | | |

STRAIGHT LINE

| | $D \geq 0$ | $D < 0$ |
|---|---|---|
| C0 | 1. $(\pm) \longrightarrow (\pm)$ (FIG.27)<br>2. A FEED PULSE $\longrightarrow$ X (FIG.27) | 1. $(\pm) \longrightarrow (\pm)$ (FIG.27)<br>2. A FEED PULSE $\longrightarrow$ Y (") |
| C1 | 1. (R5)−(R4) $\longrightarrow$ (R5) (FIG.15)<br>2. DETECTED D $\longrightarrow (\pm)$ (FIG.27) | 1. (R5)+(R3) $\longrightarrow$ (R5) (FIG.15)<br>2. D $\longrightarrow (\pm)$ (FIG.27) |
| C2 | (R1)+1 $\longrightarrow$ (R1) (FIG.15) | (R2)+1 $\longrightarrow$ (R2) (FIG.15) |
| C3 | (R1)−(R3) $\longrightarrow$ (XD) (FIG.27) | (R2)−(R4) $\longrightarrow$ (YD) (FIG.27) |

FIG.46

ARC

| | $D \geq 0$ | $D < 0$ |
|---|---|---|
| C0 | 1. $(\pm) \longrightarrow (\pm)$<br>2. A FEED PULSE $\longrightarrow$ X | 1. $(\pm) \longrightarrow (\pm)$<br>2. A FEED PULSE $\longrightarrow$ Y |
| C1 | 1. (R5)−2(R1)+1 $\longrightarrow$ (R5)<br>2. D $\longrightarrow (\pm)$ | 1. (R5)+2(R2)+1 $\longrightarrow$ (R5)<br>2. D $\longrightarrow (\pm)$ |
| C2 | (R1)−1 $\longrightarrow$ (R1) | (R2)+1 $\longrightarrow$ (R2) |
| C3 | (R3)−(R1) $\longrightarrow$ (XD) | (R2)−(R4) $\longrightarrow$ (YD) |

FIG.47

FIG.52
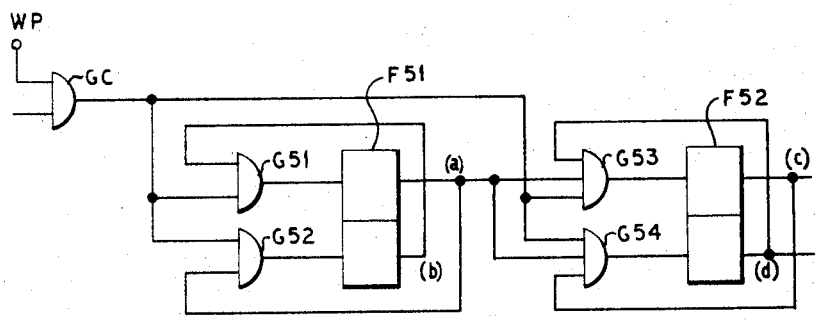
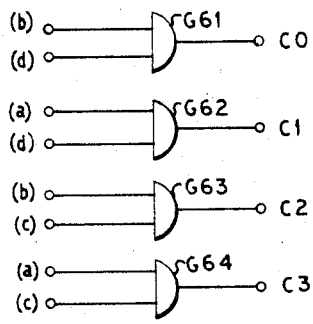
FIG.53
FIG.54a WP 
FIG.54b C0 
FIG.54c C1 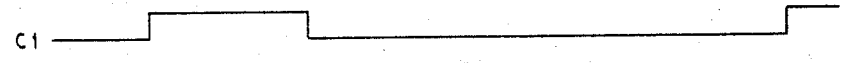
FIG.54d C2 
FIG.54e C3 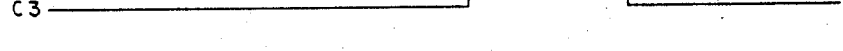

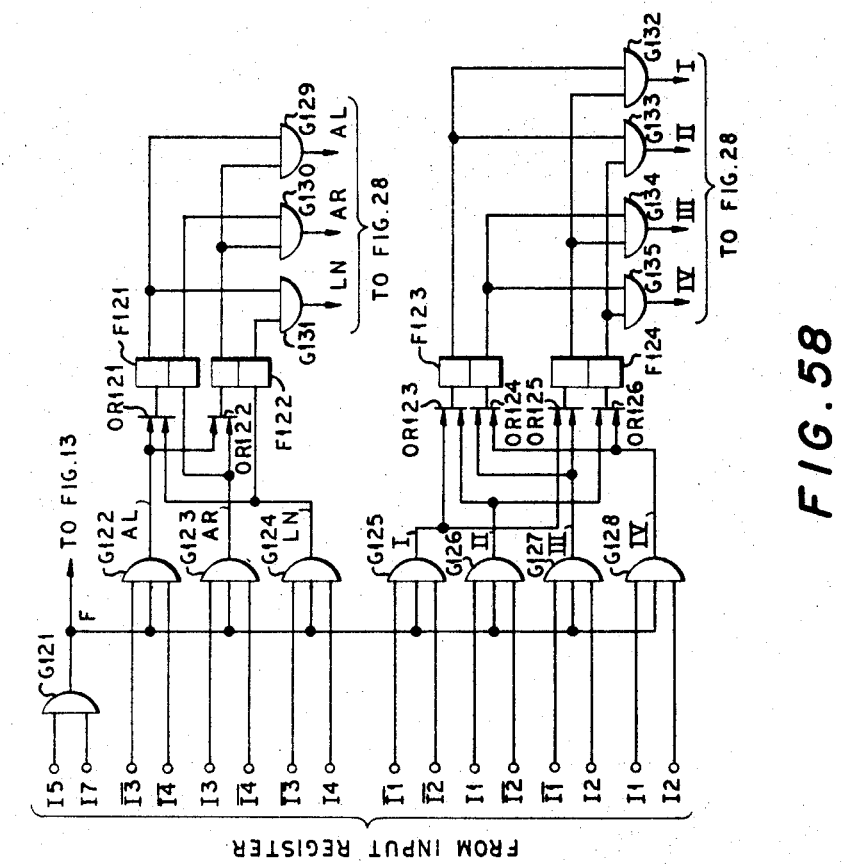

United States Patent Office 3,416,056
Patented Dec. 10, 1968

3,416,056
PROGRAMMED DIGITAL MOTOR CONTROL FOR A MACHINE TOOL USING A PULSE DISTRIBUTION TECHNIQUE
Tohru Motooka and Kusuo Yamaguchi, Tokyo, and Norito Yoshitake and Kengo Kobayashi, Kawasaki-shi, Japan, assignors to Fujitsu Limited, Kawasaki, Japan, a corporation of Japan
Continuation-in-part of application Ser. No. 114,267, June 1, 1961. This application Aug. 18, 1967, Ser. No. 661,684
Claims priority, application Japan, June 4, 1960, 35/26,867
6 Claims. (Cl. 318—162)

ABSTRACT OF THE DISCLOSURE

A machine tool is controlled in movement by a motor which in turn is controlled by pulses which move it in accordance with Cartesian coordinates. The absolute values of the start and end point coordinates of the path to be followed by the machine tool, in which of the quadrants formed by the Cartesian coordinates the path is located, and the direction of movement of the tool along the path are provided by command. The values of the coordinates of the start point and the end point are replaced with new coordinate values. Pulse distribution is provided with regard to the path formed by the new coordinate values and the distributed pulses are supplied to the motor in accordance with the quadrant of location of the path to be followed and the direction along the path and accordingly move the machine tool.

Description of the invention

The present application is a continuation-in-part of application Ser. No. 114,267, filed June 1, 1961 and now abandoned.

The present invention relates to a pulse distribution system. More particularly, the invention relates to a pulse distribution system and method for the digital control of machinery, such as machine tools or other fabricating machinery.

The principal object of the present invention is to provide a new and improved pulse distribution system. The present invention provides a new and improved machine control system. The machine control system and method of the present invention provides facile and simple control, regardless of the curvilinear or linear nature of the path of movement of the machine tool. The control system of the present invention utilizes considerably less equipment and requires considerably less calculation and operation than known systems, since calculations are made only for following a straight line or curve in the first quadrant, rather than in all four quadrants.

In accordance with the present invention, apparatus for controlling a machine tool by numerical pulses issued to the feed controls of the machine in accordance with Cartesian coordinates of a particular path to be followed during the machining operation, the Cartesian coordinates forming quadrants, comprises a motor coupled to the machine tool for moving the machine tool in coordinate direction in response to pulses. Command apparatus commands the absolute values of the start and end point coordinates of the path to be followed, commands in which of the quadrants the path to be followed is located, and commands the direction of movement of the machine tool along the path. Replacing apparatus replaces the values of the coordinates of the start point and the end point with new coordinate values. Pulse distributing apparatus performs pulse distribution with regard to the path formed by the new coordinate values.

A gate arrangement connected between the pulse distributor and the motor supplies to the motor the distributed pulses of the pulse distributing apparatus in accordance with the quadrant of location of the path to be followed and the direction along the path to be followed and moves the machine tool accordingly.

The replacing apparatus replaces the values of the coordinates of the start and end points from any of the quadrants to the first quadrant. The motor comprises a hydraulic motor coupled to the machine tool and an electric pulse motor driving the hydraulic motor and connected to the gate arrangement.

In order that the present invention may be readily carried into effect, it will now be described with reference to the accompanying drawings, wherein:

FIG. 4 is a block diagram of an embodiment of the pulse distribution system of the present invention;

FIGS. 5 and 6 are front and side elevations of a vertical milling machine capable of utilizing the pulse distribution system of FIG. 4;

FIGS. 7 and 8 are schematic diagrams of the reading head of the tape reader of the pulse distribution system of FIG. 4;

FIG. 9 is a schematic diagram of a punched tape carrying information to the reading head of FIGS. 7 and 8;

FIG. 10 is a schematic diagram of a tape punched with various codes for use with the reading head of FIGS. 7 and 8;

FIG. 11 is another, more general, schematic diagram of the tape reader of FIG. 4;

FIG. 12 is a circuit diagram of portions of the tape reading circuit of FIG. 4;

FIG. 14 is a circuit diagram of the magnet driving circuit of FIG. 11;

FIG. 15 is a block diagram of the computer circuit of FIG. 4;

FIG. 18 is a block diagram of an input register of FIG. 4;

FIG. 19 is a symbol for an AND-gate;

FIG. 20 is a symbol for an OR-gate;

FIG. 21 is a diagram of the decoder of FIG. 4;

FIG. 22 is a diagram of an E code decoding element of the decoder of FIG. 4;

FIG. 25 is a block diagram of the registers R1 to R4 of FIG. 4;

FIG. 26 is a schematic diagram illustrating the principle of the registers R1 to R4 of FIG. 25;

FIG. 29 is a circuit diagram of the input control section of the control circuit of FIG. 4;

FIGS. 30a, 30b, 30c, 30d, 30e, 30f and 30g are time graphs which illustrate the timing pulses utilized in the circuit of FIG. 4;

FIG. 31 is a schematic sectional view of a twelve pole stepping motor for operation with the circuit of FIG. 4;

FIG. 32 is a block diagram of a stepping motor control circuit for operation with the circuit of FIG. 4;

FIG. 36 is a schematic block diagram of the input register of FIG. 4;

FIGS. 37, 38 and 39 are rectangular coordinate graphs illustrating the replacement of motion on the coordinate axis for effecting motion of the machine along a straight line, along a clockwise arc, and along a second clockwise arc, respectively;

FIGS. 40a and 40b are tables of the coded information carried by the tape of the present invention;

FIG. 41 is a table of the coded outputs required for particular coded inputs of the present invention;

FIG. 42 is a table of the code for various signals of the present invention;

FIG. 43 is a table of the control conditions of the circuit of the present invention;

FIGS. 44, 45, 46 and 47 are tables of operation of various circuits of the present invention;

FIG. 52 is a circuit diagram of the cycle counter of FIG. 27;

FIG. 53 is a diagram of the outputs of the cycle counter of FIG. 52;

FIGS. 54a, 54b, 54c, 54d and 54e are graphical presentations of the output waveforms of the cycle counter of FIG. 52;

FIG. 58 is a circuit diagram of a decoder for use with the circuit of FIG. 28.

According to a known principle of machine-tool control by numerical pulses, these pulses are issued to the feed control of the machine in accordance with Cartesian coordinates of the particular straight or curved path of the desired machining operation so that the pulses are distributed along the path, between its starting point and end point, and any instantaneous true position is the accumulated or integrated result of the preceding pulses, and is continuously checked as to whether it is located on the positive or negative area of the given path in the coordinate reference system. This system of pulse distribution is represented by the example of the curved path shown in FIG. 1.

Figure 1:
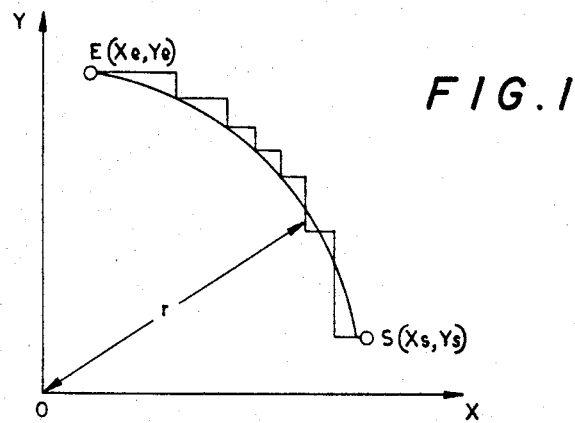
FIGS. 1 and 2 are graphs explaining digital pulse distribution for the control of machinery along an arc.

A more complete understanding of FIG. 1 may be had by first considering FIGS. 5 and 6 wherein a machine tool which can embody the principles set forth in FIG. 1 is illustrated.

In FIGS. 5 and 6, a machine bed BE1 supports a heavy upright and horizontally overhanging frame FR1. A vertical guide VG1 secured to the vertical portion of the frame FR1 slidingly supports a vertically movable knee KN1. A heavy vertical feed screw threadingly engages the knee KN1 within a suitable threaded recess, and abuts into a suitable unthreaded recess in the bed BE1 for free rotary motion. Rotation of the feed screw FSZ imparts vertical motion to the knee KN1 without causing relative translatory motion between the bed BE1 and the screw. A reversible and controllable electro-hydraulic pulse motor MZ mounted upon the bed BE1 imparts rotary motion to the screw FSZ by way of a worm WGZ engaging a pinion PZ keyed to the feed screw FSZ.

Secured to the knee KN1 is another controllable and reversible electro-hydraulic pulse motor MY having an axially extending feed screw FSY. A saddle SA1 slidingly mounted upon the knee KN1 for horizontal movement across the knee threadingly engages the feed screw FSY so as to receive horizontal motion from the motor MY. Slidingly mounted upon the saddle SA1 for movement transverse to the saddle is a worktable TA1 which receives horizontal movement by way of another controllable and reversible electro-hydraulic pulse motor MX mounted thereon and a feed screw FSX threadingly engaging the saddle SA1. The movement of the table is transverse to the movement of the saddle. Suitable means not shown secure a workpiece W1 to the table for movement therewith. A cutter CT1, such as a milling cutter, is horizontally locked in the frame FR1 but receives rotary motion from a torque motor TM mounted upon the frame.

In operation, actuation of the motor MX moves the table horizontally relative to the saddle SA1 and knee KN1. Movement to the right by the table TA1, as seen in FIG. 5, is selected as movement in the +X direction. Actuation of the motor MY moves the saddle and the table horizontally in the direction relative to the knee in the direction to the right and left in FIG. 6. Movement to the right by the table TA1 and saddle SA1 is considered movement in the +Y direction. This is indicated by the arrow in FIG. 6. Upward vertical movement effected by actuation of motor MZ by way of the feed screw FSZ results in movement in the +Z direction. Rotation of the feed screw FSZ results in vertical movement not only of the knee KN1 but also the saddle SA1 and the table TA1. As will be noted, the workpiece may therefore be moved in any number of directions at any one time in an X–Z plane, a Y–Z plane as well as an X–Y plane.

Returning to FIG. 1, the latter shows, by way of a rectangular coordinate graph having X and Y axes, a curve having a starting point S located relative to the Cartesian coordinate axes at position $(Xs, Ys)$, and an end point E located at position $(Xe, Ye)$. The X and Y axes represent the mutually perpendicular directions, for example, horizontal directions, in which a movable workpiece may be driven relative to the cutting tool of a machine tool, for example the vertical milling machine of FIGS. 5 and 6. The curve SE represents the predetermined path to be followed by the workpiece relative to the cutting tool, or alternatively it may represent the path to be followed by the cutting tool relative to the workpiece. Thus the direction X may represent the component of motion of the workpiece relative to the cutter (or the cutter relative to the workpiece) in one horizontal direction, and the Y direction represents the component of movement of the workpiece relative to the cutter (or the cutter relative to the workpiece) in a horizontal direction transverse to the X direction. The position of the workpiece relative to the cutting tool (or the cutting tool relative to the workpiece) in any X–Y plane relative to an origin, is designated X, Y. X represents the displacement from the origin in the X direction and Y represents the displacement from the origin in the Y direction. For the workpiece or the cutter to follow the curve, a pulse must first issue to X-axis output. It is then determined whether the new present point lies on the upper or on the lower side of the curve in accordance with the following formulae.

$$(Xs-X)^2+(Ys+Y)^2-r^2 \geq O \quad (1)$$
$$(Xs-X)^2+(Ys+Y)^2-r^2 < O \quad (2)$$

If Equation (1) is satisfied, then pulse issuance toward the X-axis will continue. If Equation (2) is satisfied, pulse issuance toward the X-axis ceases, and instead, pulses are supplied toward the Y-axis. The pulse distribution may thus be effected in such a manner that a given line or curve may be followed with a tolerance of one pulse.

Only the pattern for following the arc SE in the counterclockwise direction from a starting point S to an end point E, within the first quadrant, is described relative to FIG. 1. Any of the four quadrants of a Cartesian coordinate system can be the location of arc SE. Frequently these arcs must be followed from the starting point in a clockwise direction. Four such arcs are shown situated in the four quadrants in FIG. 2.

Figure 2:
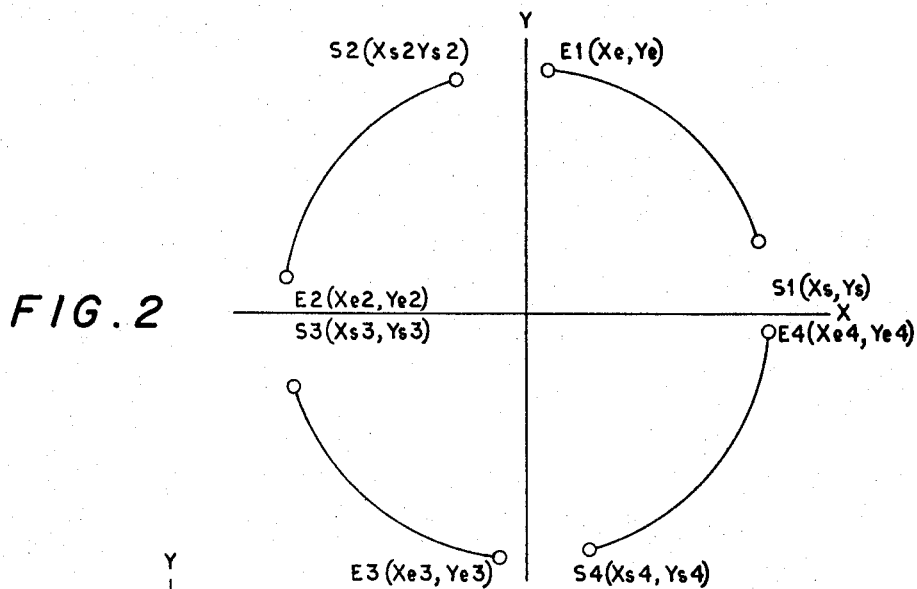

In FIG. 2 there is shown a counterclockwise-directed arc S1E1 having a starting point S1 located at $(Xs, Ys)$ and an end point E1 located at $(Xe, Ye)$, in the first quadrant; a counterclockwise-directed arc S2E2 having a starting point S2 at location $(Xs2, Ys2)$ and an end point E2 located at $(Xe2, Ye2)$; a counterclockwise-directed circular arc S3E3 in the third quadrant having a starting point S3 located at $(Xs3, Ys3)$ and an end point E3 located at $(Xe3, Ye3)$; and in the fourth quadrant a circular counterclockwise-directed arc S4E4 having a starting point S4 located at $(Xs4, Ys4)$ and an end point E4 located at $(Xe4, Ye4)$.

The absolute coordinate values of the starting points S2, S3 and S4 and the end points E2, E3 and E4 of the counterclockwise arcs, located in the second, third and fourth quadrants can be respectively replaced by the coordinate values of the starting point S1 and the end point E1 of the arc located in the first quadrant. Such replacement is accomplished in accordance with the following table.

TABLE I

| The quadrant where the curve belongs | Start point | End point |
| --- | --- | --- |
| The 2nd quadrant | $\|Xs2\|=Ys$<br>$\|Ys2\|=Xs$ | $\|Xe2\|=Ye$<br>$\|Ye2\|=Xe$ |
| The 3rd quadrant | $\|Xs3\|=Xs$<br>$\|Ys3\|=Ys$ | $\|Xe3\|=Xe$<br>$\|Ye3\|=Ye$ |
| The 4th quadrant | $\|Xs4\|=Ys$<br>$\|Ys4\|=Xs$ | $\|Xe4\|=Ye$<br>$\|Ye4\|=Xe$ |

FIG. 2 and Table I show that the arch in the second to fourth quadrant can all be replaced with an arc in the first quadrant by applying the absolute values of the start point $Xs, Ys$ and the end point $Xe, Ye$, or by exchanging their values. In the process of pulse distribution along each curve, these curves are first replaced with the one which exists in the first quadrant, and the calculation and pulse distribution are made in accordance with the curve in the first quadrant. Then the output pulses X and Y to the X and Y axes, distributed by the curve in the first quadrant, must issue into two of four suitable terminals $(+\lambda)$ $(-\lambda)$ $(+\mu)$ $(-\mu)$ according to the particular quadrant in which the given curve belongs, as determined by Table II.

TABLE II

| The quadrant where the curve belongs | Output pulses distributed by the curve existing in the first quadrant | |
| --- | --- | --- |
| | X | Y |
| The 1st quadrant | $-\lambda$ | $+\mu$ |
| The 2nd quadrant | $-\mu$ | $-\lambda$ |
| The 3rd quadrant | $+\lambda$ | $-\mu$ |
| The 4th quadrant | $+\mu$ | $+\lambda$ |

Hence it is is possible to follow any curve in every quadrant while limiting pulse distribution to a curve located in the first quadrant. When a curve passes through two or more quadrants, it is necessary to divide it into separate quadrants.

The output pulses which are now divided in accordance with their quadrants lead into six terminals $+X$ $-X$ $+Y$ $-Y$ $+Z$ and $-Z$. The Z terminals represent the vertical direction shown by the FIGS. 5 and 6. The curve may exist in an X–Y plane, a Y–Z plane or a Z–X plane. Particular curves in particular quadrants are shifted from the second, third and fourth quadrants to the first quadrant in the Z–X and Z–Y planes in a manner corresponding to that of the X–Y plane, and passed to two of the output terminals $(+\lambda)$ $(-\lambda)$ $(+\mu)$ $(-\mu)$, and are divided in accordance with Table II.

Relative to clockwise-directed curves, those in every quadrant can be replaced with an arc in the first quadrant. The pulses for following clockwise lines are distributed according to the schedule in Tables III and IV.

TABLE III

| | | |
| --- | --- | --- |
| The 1st quadrant | $X's=Ys$<br>$Y's=Xs$ | $X'e=Ye$<br>$Y'e=Xe$ |
| The 2nd quadrant | $\|X's2\|=Xs$<br>$\|Y's2\|=Ys$ | $\|X'e2\|=Xe$<br>$\|Y'e2\|=Ye$ |
| The 3rd quadrant | $\|X's3\|=Ys$<br>$\|Y's3\|=Xs$ | $\|X'e3\|=Ye$<br>$\|Y'e3\|=Xe$ |
| The 4th quadrant | $\|X's4\|=Xs$<br>$\|Y's4\|=Ys$ | $\|X'e4\|=Xe$<br>$\|Y'e4\|=Ye$ |

TABLE IV

| | X | Y |
| --- | --- | --- |
| The 1st quadrant | $-\mu$ | $+\lambda$ |
| The 2nd quadrant | $+\lambda$ | $-\mu$ |
| The 3rd quadrant | $+\mu$ | $-\lambda$ |
| The 4th quadrant | $-\lambda$ | $-\mu$ |

Figure 3:
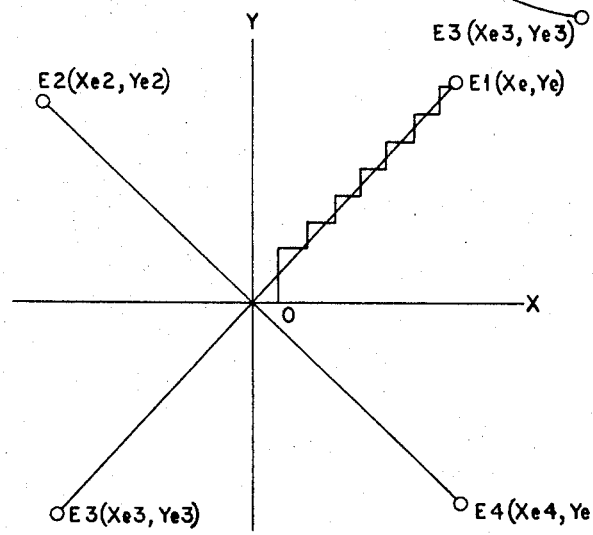
FIG. 3 is a pulse distribution graph explaining a machining operation along a straight line.

While the above description confirms pulse distribution effected by virtue of an arc in each quadrant, the same operation will be effective as to straight lines or any other curves. FIG. 3 shows the pulse distribution for following a straight line. In this figure all straight lines in every quadrant have starting points at the origin. For following a straight line the schedule of Tables V and VI must be applied.

TABLE V

| | | |
| --- | --- | --- |
| The 2nd quadrant | $\|Xe2\|=Ye$ | $\|Ye2\|=Xe$ |
| The 3rd quadrant | $\|Xe3\|=Xe$ | $\|Ye3\|=Ye$ |
| The 4th quadrant | $\|Xe4\|=Ye$ | $\|Ye4\|=Xe$ |

TABLE VI

| | X | Y |
| --- | --- | --- |
| The 1st quadrant | $+\lambda$ | $+\mu$ |
| The 2nd quadrant | $+\mu$ | $-\lambda$ |
| The 3rd quadrant | $-\lambda$ | $-\mu$ |
| The 4th quadrant | $-\mu$ | $+\lambda$ |

Thus according to the invention we provide a method and means for pulse distribution wherein we effect pulse distribution by giving commands corresponding to the quadrant in which the straight line or curve to be followed exists, corresponding to their types of patterns, their absolute values of coordinates at the point of start and end, and we replace all straight lines or curves with curves existing in the first quadrant.

By virtue of our invention, when the pulse distribution is effected, the number or the kinds of commands given are reduced. Moreover, by virtue of the invention, it is only necessary to make calculations for following a straight line or a curve existing in the first quadrant, instead of curves or straight lines existing in all quadrants. We thereby obtain a noteworthy saving in calculation, operation and equipment in circuitry necessary for pulse distribution operation.

The circuitry which embodies the concept of the invention is illustrated by way of a block diagram showing one example of the pulse distribution using the method of this invention, in FIG. 4. Referring to FIG. 4, the information for following a curve is carried by a tape TA passing through a tape reader TR of the photo-electric type. A register RI receives the digital tape-reader output and feeds the latter to a register RV and a register RP. A pulse generator PS receives the output of register RV and actuates a control circuit CoC. A decoder DR is actuated by the output of the register RI and pulses a gate circuit GI. A second gate circuit GII receives pulses from the register RP as well as from the gate circuit GI. Actuated by the control circuit CoC is a computer CuC which cooperates with the registers R1, R2, R3, R4 and R5 and return feeds the control circuit. The control circuit passes X and Y signals to the gate circuit GI.

The input information supplied to the tape reader TR of FIG. 4 and carried by the tape TA comprises the following:

(a) The numeral, which represents the coordinate values of the start and end points of a straight line or curve and is determined after selection of the coordinate system. In the case of a straight line, the basic coordinate axis must be moved in parallel so that the origin of the coordinates coincides with the start point. In the case of an arc, the origin coincides with the center of the arc. In the above, the absolute values of the coordinates at the start and end points are designated "numeral" and have the valve $Xs$ $Ys$ $Xe$ $Ye$. In the case of an arc extending into two or more quadrants, we determine the start and end points by dividing the arc into separate quadrants.

(b) Space signals, S-numerals $Xs$ $Ys$ $Xe$ and $Ye$, punched on the tape, are separated from each other by a space signal S as indicated below. For a previously determined punching order of, for example, $Xs$, $Ys$, $Xe$, and $Ye$ upon the tape, we obtain the punching:

$Xs$ S $Ys$ S $Xe$ S $Ye$ S

Thus, when for example, $Xs$=54.04 millimeters, $Ys$=63.00 millimeters, $Xe$=0, and $Ye$=83.00 millimeters, they appear punched on the tape in the following order:

5404 S 6300 S O S 8300

(c) The feed rate V, which designates the generating rate for the feed pulses.

(d) The coordinate plane P, which designates the plane X–Y, Y–Z, or Z–X, in which the straight line or curve is located.

(e) The indication of function F, which designates the type of function and the quadrant wherein the straight line or curve to be followed is located. For example, for designating a straight line (LN), a counterclockwise arc (AL) and a clockwise arc (AR), we punch the tape in accordance with one of twelve commands listed in the schedule of Table VII.

TABLE VII

| | Straight line | Arc line | |
|---|---|---|---|
| | | CCW | CW |
| The 1st quadrant | LN1 | AL1 | AR1 |
| The 2nd quadrant | LN2 | AL2 | AR2 |
| The 3rd quadrant | LN3 | AL3 | AR3 |
| The 4th quadrant | LN4 | AL4 | AR4 |

(f) The ON-OFF command T, which halts readout or reading from the tape and initiates special operation of the control system. The ON-OFF command T then, after assuring the finish of the special operation, again starts the tape reader. Reading of the next signal from the tape is then effected.

(g) The end signal E, which indicates the end of an operation to stop the machine.

The input signals punched in the tape must occur in a predetermined order, as follows: XsS YsS XeS Ye VPF.

The above sequence designates one period of operation. The ON-OFF command T and the end signal E will be considered respectively an independent period of operation. Signal information V and P will be memorized respectively in registers RV and RP to be more fully explained later. Only in case of differing from the precoding period of operation, designation must be made.

The circuit of FIG. 4 operates as follows. Signal information detected by the tape reader TR passes to the register RI. The contents of the signal are then deciphered by the decoder DR. Deciphering of the signal affects the control circuit CoC as follows. If the signal represents a numeral, it passes, by way of computer CuC into registers R1, R2, R3 and R4 in a designated order, for example first into the register R1. If the information is a space signal S, registers R1, R2, R3 and R4 must be changed over and the following register, for example R2, R3, R4 or R1 is readied for receiving a numeral. The command feed rate, or V signal from the tape reader passes to the registor RV which, according to the contents of the V signal, adjusts the frequency of the feed-pulse generator PS. The coordinate plane signal P passes to the register RP which sets the output gate GII.

If the incoming signal is F, indication of function, it stops the tape reader TR and starts the designated calculation operation in the computer circuit CuC. The computer CuC utilizes register R5 as a temporary memory for the results of the calculation or computing operations. This controls the output gate GI in accordance with the calculation or computation result and passes output pulses X and Y respectively into the appropriate ones of the output terminals $(+\lambda)$, $(-\lambda)$, $(+\mu)$ and $(-\mu)$ of the gate circuit GI. The output pulses from the latter four terminals pass to the six terminals $(+X)$ $(-X)$ $(+Y)$ $(-Y)$ $(+Z)$ $(-Z)$ according to the signal information P, the coordinates plane signal, which passes to the register RP and the output gate GII. When pulse distribution during one period ends, the tape reader again starts to read new information.

If the signal to tape reader TR is an ON-OFF command signal T, the tape will stop and begin the special operation of the control system. Upon receipt of a signal showing completion of the special operation, the signal T again drives the tape. Thus tape reading is continued.

End signal E stops the machine.

A typical cycle occurs as follows: When a numeral, signals S, P and V and finally a signal F upon the tape are read by the tape reader TR, the tape reader is stopped by the F signal, the predetermined calculation operation then follows as determined by the numeral and the function signal F which are memorized in the registers R1 to R4. At this moment calculations or computation operations are effected as to a straight line or a curve existing in the first quadrant. As the result of the computation passes to the output gates GI and GII by way of the control circuit, the distribution pulses which depend on the results are generated at the terminals of said output gates GI and GII.

Further details of the present invention are hereinafter described, particularly with regard to the circuit of FIG. 4, details of which are shown in the figures.

The predetermined information is carried upon digitally punched tapes, as shown in FIGS. 9 and 10, which move through the tape reader TR of FIG. 4. FIGS. 7 and 8 illustrate schematically diagrams of the reading head of the tape reader used in the present invention. An elongated lamp LA having a coaxial elongated filament FI and positioned transverse to the long direction of the tape emits a light beam transverse to the tape. A cylinder lens LE positioned between the lamp LA and the tape TA extends transversely to the longitudinal direction of the tape across the entire width of the tape, and focuses the light from the lamp LA along a straight line across the width of the tape so that one row of punch holes transverse to the tape is illuminated at any one time. The tape TA, as seen in FIGS. 9 and 10, includes a plurality of aligned punch holes in rows transverse to the longitudinal direction of the tape, in the usual manner. Each row can carry a predetermined number of holes at predetermined positions. The existing holes and their positions are indicative of the information within each row.

Opposite the lamp LA on the other side of the tape TA, the tape reader TR carries a plurality of photo diodes PD1 to PD9, of which only PD1 is shown, corresponding in number to the maximum number of holes in each transverse row of the tape and corresponding in position to the positions of all the holes which each row in the tape can carry. Thus, when holes are punched at particular positions in the tape, as the tape feeds past the lamp LA and lens LE, particular ones of the photo diodes PD1 to PD9, corresponding to the existing punch holes in each row and corresponding to the information to be passed to the photo diodes, are energized by the light from said lamp. In the present invention, there are nine photo diodes arranged at right angles to the tape. The photo diodes read an 8-digit code and 1 sprocket hole. For the tape shown in FIGS. 9 and 10, one of the eight photo diodes set to read code is not used. The punched tape in FIG. 9 carries the information 5404 S 6300 S.

FIG. 10 shows a tape punched with 12 kinds of F codes, 4 kinds of P codes, 8 kinds of ON-OFF (AUX) codes and E codes in suitable order.

In FIG. 11 the tape reader of FIG. 4 comprises a frame FR2 rotatably supporting a capstan motor CM which drives a capstan roller CR by way of a belt BT. The tape TA passing from a supply spool to a takeup spool not shown, passes close to the capstan roller over a photo-diode head PDH which supports the nine photo diodes PD1 to PD9 (FIG. 7). The lamp LA and the lens LE of FIGS. 7 and 8 are located by suitable mounting means (not shown) above the photo-diode head PDH in the relation shown in both FIGS. 11 and 7. A pinch roller PR1 rotatable along the horizontal axis passing in and out of the sheet in FIG. 11 is vertically movable by means of a feed magnet FM. When the feed magnet FM is energized, the pinch roller PR1 is moved vertically downward to bias the tape TA against the capstan roller CR and frictionally move the tape to the left in FIG. 11. A brake magnet BM selectively moves a second pinch roller PR2 against a fixed brake shoe BS mounted in the frame FR2 to thereby stop movement of the tape TA. Means are provided to control the feed magnet and brake magnet so that only one is operative at a time. Each can be magnetized and demagnetized by switching the coils on and off. The capstan motor keeps the capstan roller CR in continuous rotation. When the feed magnet FM is magnetized and the brake magnet BM demagnetized the pinch roller PR1 biases the tape TA against the capstan roller CR and moves the tape in the leftward direction. The information on the tape is read by the photo-diode head PDH and connected with the reading amplifier RA shown in FIG. 12. The tape is stopped by the control means which lift the pinch roller PR1 from the capstan roller CR and which energize the brake magnet BM to press the pinch roller PR2 against the brake shoe BS.

The photo-diode reading amplifier connects to each diode as shown in FIG. 12. When light impinges upon any diode PD1 to PD9, the photo diode, which includes one electrode connected by way of resistor RE1 to $-16$ volt potential and another electrode connected to a $+6$ volt potential, creates a perceptible voltage change at the negatively connected electrode. A commonly known amplifier RA amplifies this change. The circuits for the other 8 photo diodes PD2 to PD9 are the same as the one shown in FIG. 12. Thus, there are nine reading amplifiers RA in all. Each reading amplifier RA transmits the read signals S and the inverse signals $\overline{S}$ which are antipolar to S.

Figure 13:
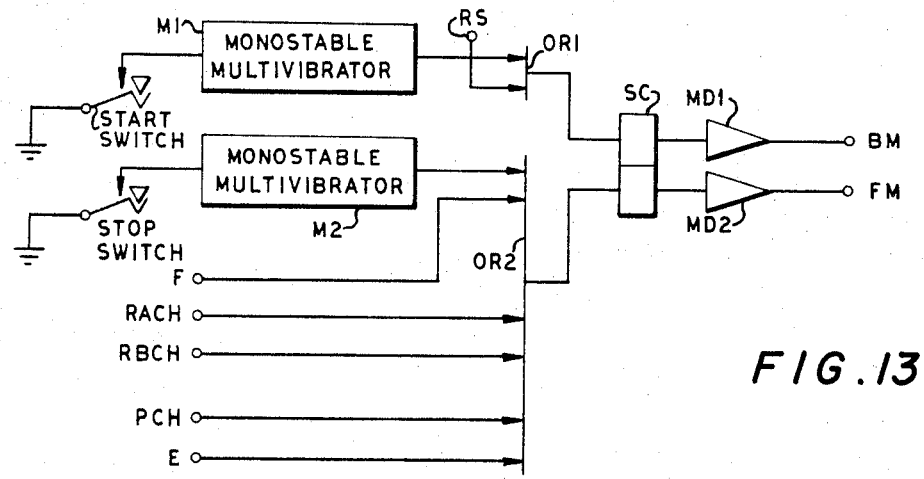
FIG. 13 is a circuit diagram of a circuit for controlling the tape reader of FIGS. 4, 7 and 8.

The tape reader TR is controlled by the tape-reader control section illustrated schematically in FIG. 13. This section comprises a manual start switch and a manual stop switch, each connected to ground at one side and then to the respective inputs of separate monostable multivibrators M1 and M2. The monostable multivibrators M1 and M2 each operate in their labile conditions for 200 microseconds and pass an output to OR-circuits OR1 and OR2 respectively. The output of OR-circuit OR1 passes to a flip-flop circuit SC having outputs respectively to separate magnetizing circuits MD1 and MD2. Each of the magnetizing circuits MD1 and MD2 operates the one of the brake magnets BM or feed magnets FM in FIG. 11. The OR-circuit OR1 receives a second signal from an input RS in addition to the input from the monostable multivibrator M1. Five other input signals can pass to the OR-circuit OR2, namely a function input F, an end input E and an input PCH from the decoder in FIG. 4, as well as inputs RACH and RBCH from the computation circuit CuC.

In operation, the start and stop switches in FIG. 13 indicate the contacts in the manual pushbuttons. When the start button is pressed, it opens its circuit, and release of the button again closes the circuit. When a respective circuit is closed, the rise of the signal triggers the monostable multivibrator M1. M1 transmits a signal of 200 microsecond pulse width and triggers the flip-flop SC. The flip-flop SC may also be triggered by the RS signal more particularly described with respect to FIG. 27. The magnet-driving circuit MD1, operated by the output from the flip-flop SC, and more particularly described with respect to FIG. 14, serves when energized to denergize the brake magnet BM. A second magnet-driving circuit MD2 connected to the other output of the flip-flop SC energizes the magnet FM when it receives no signal from the flip-flop SC. When the input of the magnet-driving circuit MD2 is energized, the magnet FM loses current. Thus, in FIG. 13, when the flip-flop SC is triggered by RS or with the output from the monostable multivibrator M1, the output at the lower output terminal of said flip-flop becomes zero. As a result, current flows in the feed magnet FM and drives the tape. Simultaneously, the signal output at the upper output terminal of the flip-flop SC energizes the circuit MD1 and deenergizes the brake magnet BM. On the other hand, when the stop button is actuated, or when F and E are read, or when an alarm signal such as RACH, RBCH or PCH issues through the OR-gate OR2 to the flip-flop SC, the brake magnet BM is activated and the feed magnet FM is deenergized or released.

FIG. 14 shows schematically the magnet-driving circuit MD connected to one of the magnets BM or FM. A simple transistor TR1 has a grounded emitter electrode, a base electrode connected to the output of the flip-flop SC, and a collector electrode connected to a $-50$ volt source through the coil of the magnet BM or FM. As shown, the transistor TR1 is biased into conduction through its major current path from emitter to collector. An input from the flip-flop SC biases the transistor TR1 off so as to deenergize the magnet FM or BM.

The input register RI of FIG. 4 is shown in FIG. 18. A plurality of flip-flop circuits F1 to F8 are of known type. Signals S1 to S8 and $\overline{S}1$ to $\overline{S}8$, which correspond to the outputs of the eight photo diodes PD1, are provided at the output of the reading amplifier RA of FIG. 12. The signal SPR reads from the sprocket hole in the tape.

Signals pass to the input S1 to S8 and $\overline{S}1$ to $\overline{S}8$ according to the codes on the tape. Reading of the sprocket hole causes these signals to be stored in flip-flops F1 to F8. The sprocket hole is located on the same center line with the holes for the code. However, its diameter is smaller than that of the latter. Therefore, when the signals SPR arrive at the flip-flop F1 to F8 they lag behind the code signals. The contents of the input register are therefore kept unchanged until the tape travels a sufficient distance for read-out of the next code in the row of holes punched alongside the previously read holes. The output to the input register RI is denoted as I1 to I8 and $\overline{I}1$ to $\overline{I}8$.

The decoder DR of FIG. 4 comprises a number of decoder elements and interprets the meaning of the information stored in the register RI. Each decoder element is composed of AND-gates and OR-gates using germanium diodes. The symbol for the AND gates is shown in FIG. 19 and the symbol for the OR-gates in FIG. 20. Each decoder element must first be able to recognize the code for its particular group. Thus, for example, the decoder element must first be able to recognize the twelve kinds of F codes. Such a decoding element is shown in FIG. 21.

The code employed in this embodiment of the invention is set forth in the two tables of FIG. 40, wherein a plurality of horizontal holes in the larger left-hand portion of each table represent the existence and spatial relation between the punched holes in the tape, and the legends on the right-hand portions of the tables indicate the meaning of each horizontal row of holes. The 12 F codes are shown in the lower portion of the right-hand table. The existence of a hole in each row is considered equal to a signal of 1 and the existence of a space in each horizontal row denotes a value of zero. The rows are divided into vertical columns corresponding to the outputs I1 to I8, shown at the top of each table, of each flip-flop in FIG. 18. The 12 F codes are characterized by the fact that $I7=1$, as may be observed from the fact that each one of the vertical spaces under I7 in the horizontal F rows has holes, by the fact that $I5=1$, as may be readily observed by the holes in the vertical column under I5 within the F code range, and by the fact that at least one of I4 and I3=zero. Thus, $$F = I7 \text{ AND } I5 \text{ AND } \bar{I}4) \text{ OR } (I7 \text{ AND } I5 \text{ AND } \bar{I}3)$$

The symbol $\bar{I}$ indicates $I=$zero. In FIG. 21, therefore, the three inputs to AND-gate G1 are connected to the outputs I7, I5 and $\bar{I}4$ of FIG. 18 while the three inputs to AND-gate G2 connect to I7, I5 and $\bar{I}3$ of FIG. 18. As will be noted, because the flip-flops F1 to F8 in FIG. 18 have opposite outputs, in the usual manner, an output at $\bar{I}3$ indicates that no signal occurs at I3.

Returning to FIG. 21, if either of the conditions for operation of gate G1 or gate G2 is satisfied, an output will occur at F through gate ORF.

With regard to the E code, the following formula applies:

$$E = \bar{I}7 \text{ AND } I6 \text{ AND } \bar{I}5 \text{ AND } \bar{I}4 \text{ AND } \bar{I}3 \text{ AND } I2$$

The corresponding circuit for the E code is illustrated schematically in FIG. 22, wherein the AND-gate G3 requires all six inputs shown to produce an output corresponding to the E code.

Figure 23:
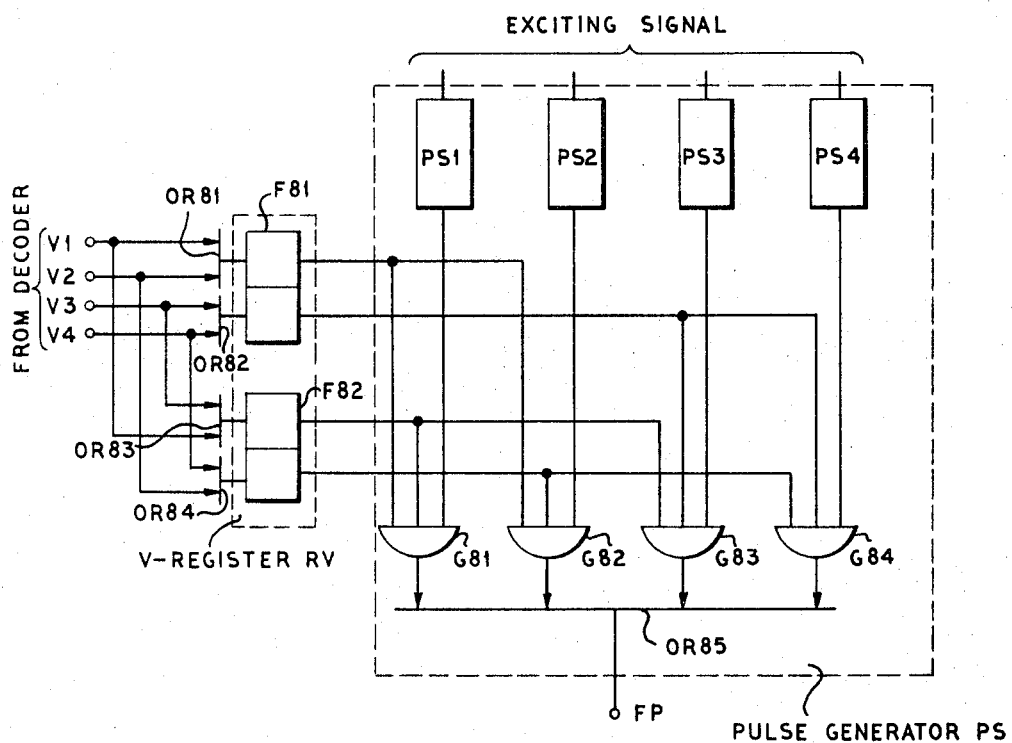
FIG. 23 is a circuit diagram of the pulse generator and the V-register of FIG. 4.
Figure 55:
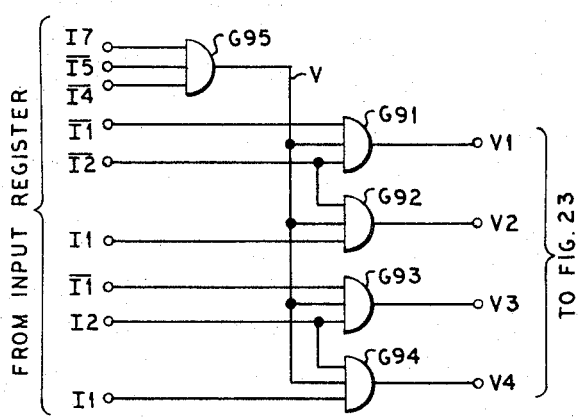
FIG. 55 is a circuit diagram of a V code decoder which may be utilized in FIG. 4.

The V-register RV for the command feed rate V as shown in FIG. 23, comprises two flip-flop circuits F81 and F82, each alternately energized by V1, V2 and V3, V4, respectively. The four kinds of feed speed designating codes V1 to V4 are decoded by the decoder DR from the output of the input register RI and are stored in the register RV. To provide for the setting of the input of the flip-flop F81, V1 and V2 are applied to the set input of said flip-flop through an OR-gate OR81. To provide for the resetting of the input of the flip-flop F81, V3 and V4 are applied to the reset input of said flip-flop through an OR-gate OR82.

The pulse generator PS of FIG. 23 comprises four blocking oscillators PS1 to PS4, each determining the feed speed of the machine tool. Each receives an energizing, exciting or excitation signal. The blocking oscillator PS1 provides pulses for rapid traverse. When the exciting signal applied to the blocking oscillators PS1 to PS4 is zero, the blocking oscillator PS1 oscillates at 150 pulses per second. When the exciting signal becomes 1, the frequency decreases gradually. After .1 second, the frequency reaches 1000 pulses per second. The blocking oscillators PS2 to PS4 are pulse generators for cutting feed, each oscillating at from 10 to 500 pulses per second.

The frequency of these blocking oscillators is predetermined by a dial on the control panel. The output pulses of blocking oscillators PS1 to PS4 are selected by the respective outputs of the V-register and are provided as feed pulses FP.

When the signal V1 is decoded by the decoder, both flip-flop circuits F81 and F82 are set, only the gate G81 is then open, and the pulse from the oscillator PS1 is provided via an OR-gate OR85. When the signal V3 is decoded by the decoder, the flip-flop F81 is reset, the flip-flop F82 is set, only the gate G83 is open, and the pulse from the oscillator PS3 is provided via the OR-gate OR85.

Figure 24:
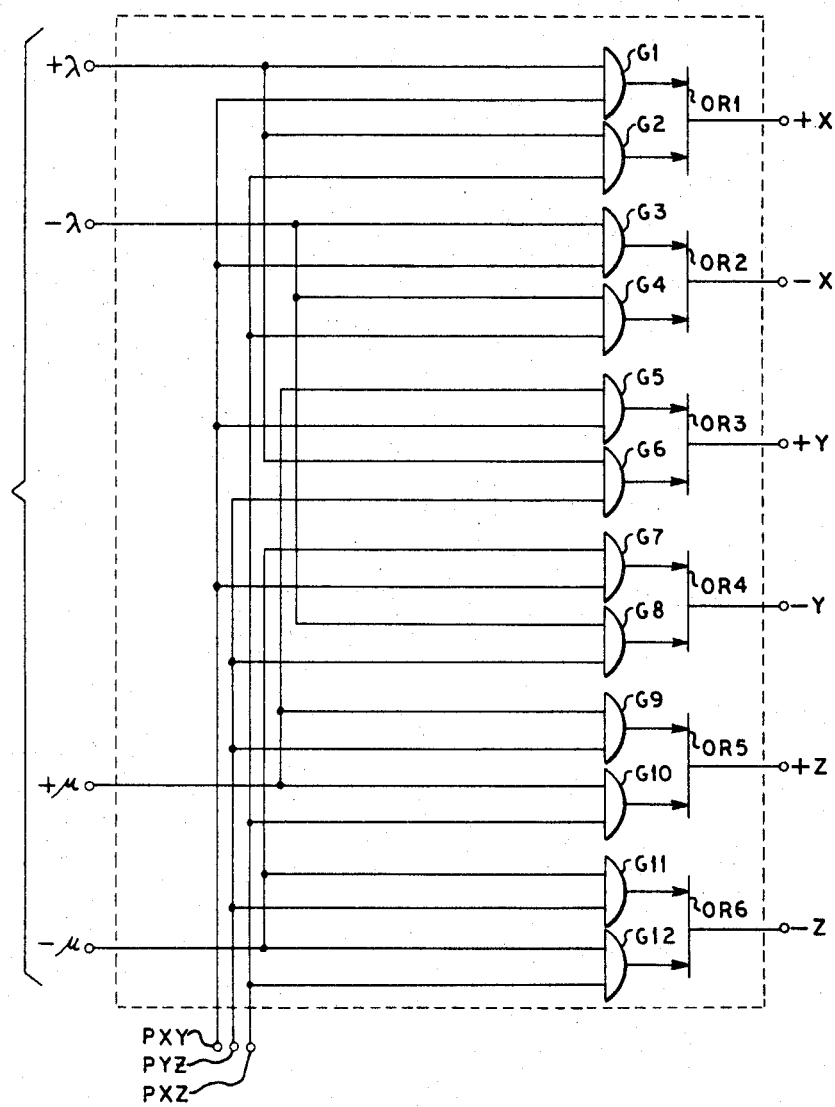
FIG. 24 is a circuit diagram of an output gate and P-register of FIG. 4.

The P-register appears schematically in FIG. 24, together with the output gate G2. The coordinate plane designating P-register RP, shown in FIG. 56, comprises two flip-flop circuits FFP1 and FFP2. Three kinds of plane designating codes XY, YZ and ZX are decoded by the decoder DR from the output of the input register RI and are stored in the register RP.

Figure 56:
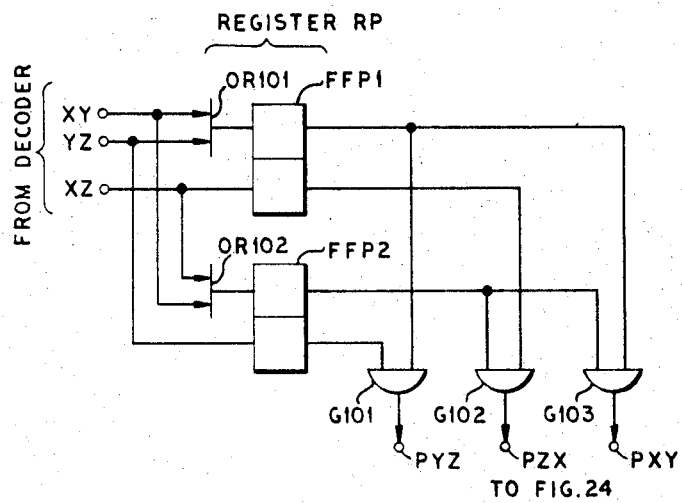
FIG. 56 is a circuit diagram of the inputs to FIG. 24 from the decoder.

As shown in FIG. 56, the signals XY and YZ are supplied to the set input of the flip-flop FFP1 via an OR-gate OR101. The input signal XZ is supplied to the reset input of the flip-flop FFP1 directly. The signals XY and XZ are supplied to the set input of the flip-flop FFP2 via an OR-gate OR102. The input signal YZ is supplied to the reset input of the flip-flop FFP2 directly. Thus, when the signal XY is decoded by the decoder, an output is provided at the AND-gate G103 only. When the signal YZ is decoded by the decoder, an output is provided at the AND-gate G101 only. When the signal XZ is decoded by the decoder, an output is provided at the AND-gate G102 only.

Figure 57:
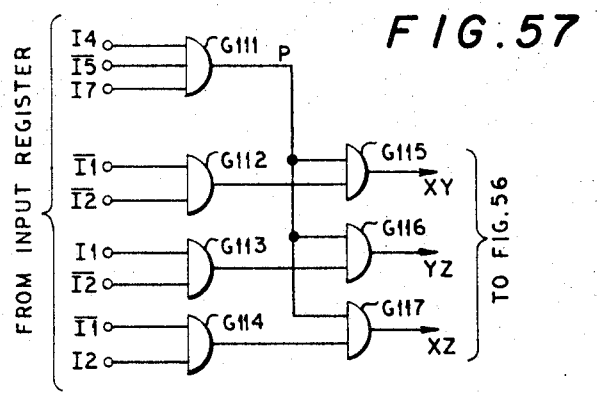
FIG. 57 is a circuit diagram of a P code decoder which may be utilized in FIG. 4.

FIG. 57 discloses a decoder which functions to provide the signals XY, YZ and XZ. This is accomplished by decoding the P code which designates in which plane the curve to be followed is located.

The gate circuit GII combines the outputs of the P-register RP, with the outputs of the gate circuit GI. The inputs to the gate circuit GII from the gate circuit GI comprise the factors $(+\lambda)$, $(-\lambda)$, $(+\mu)$, $(-\mu)$ previously discussed. The gate GII itself comprises a plurality of AND and OR-gates combined to produce six outputs $+X$, $-X$, $+Y$, $-Y$, $+Z$, or $-Z$, in accordance with the table of FIG. 41. The AND and OR-gates in this circuit operate in the usual manner so that the outputs correspond to that of the table of FIG. 41.

The gate circuit GI also comprises a plurality of AND and OR-gate circuits. It receives the output signals from the decoder DR, that is, the outputs in accordance with the input function signal F according to Table VII, and combines them with the values X and Y in accordance with Tables I to VI. The outputs of the gate circuit GI are the factors $(+\lambda)$, $(-\lambda)$, $(+\mu)$, $(-\mu)$.

Figure 27:
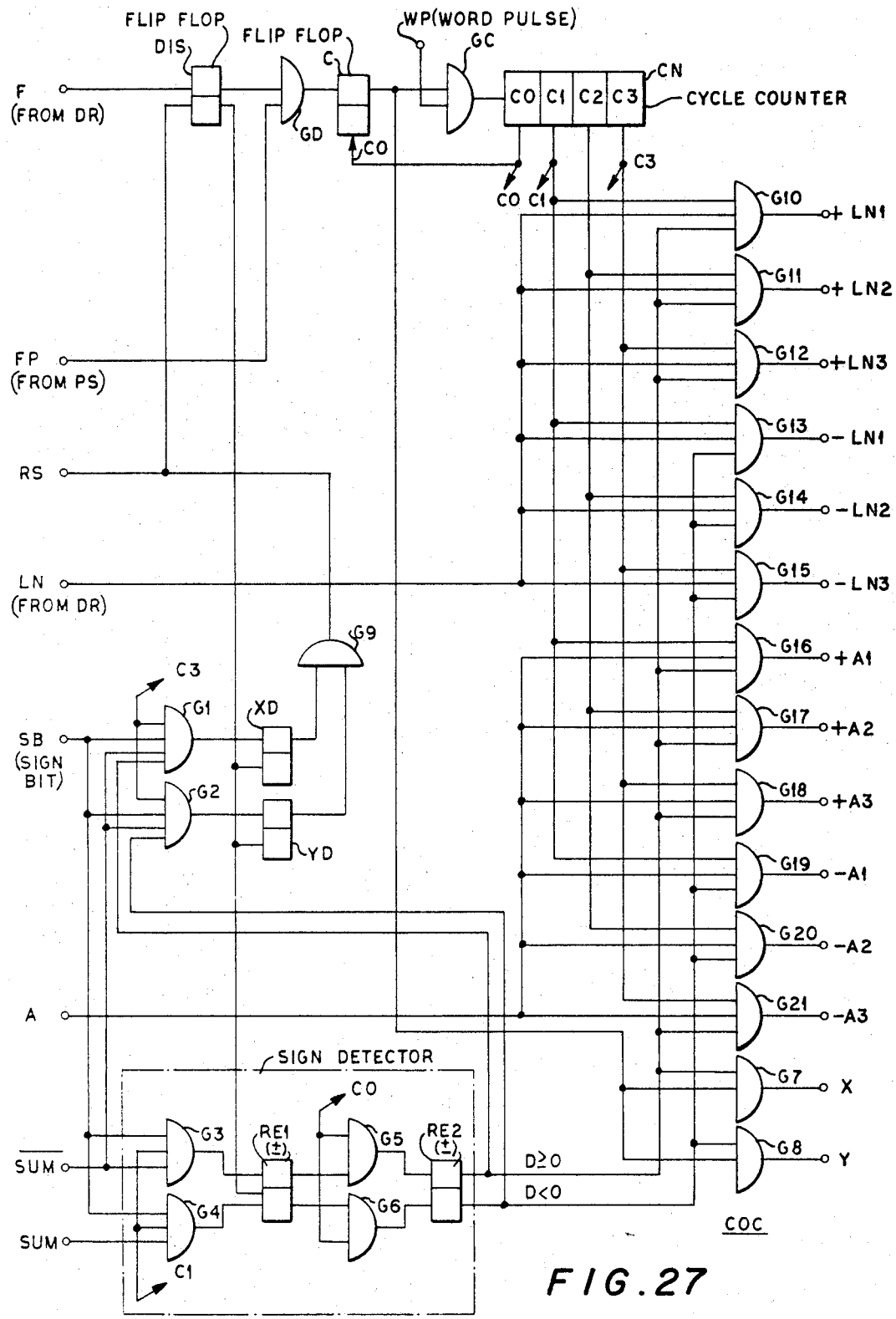
FIG. 27 is a circuit diagram of an operation control section which together with an input control section of FIG. 29 forms the control circuit CoC of FIG. 4.

The control circuit or unit CoC which provides the X and Y values to the gate GI comprises an operation control section, shown in FIG. 27, and an input control section, shown in FIG. 29. The operation control section of FIG. 27 comprises a cycle counter CN, output gates G10 to G21, registers RE1, RE2, and various AND and OR-circuits. In FIG. 27, a flip-flop DIS is triggered by a function indicator F code from the decoder DR and opens a gate GD. A flip-flop C, which is triggered by a feed pulse from the pulse generator PS of FIG. 4 via the gate GD, opens an AND-gate GC. The cycle counter CN connected to the output of gate GC, represents a two-stage binary counter counting the word pulses WP passing through the gate GC, and controls the output gates G10 to G21 and gates G1 to G6. A pair of registers RE1 and RE2 stores a detected result indicating whether the present coordinate point of the workpiece lies in the minus or plus area of a designated curve. The registers RE1 and RE2 together with the gates G3, G4, G5 and G6, which receive their input signals from the calculating circuit CuC of FIG. 15, constitute the sign detector. A pair of registers YD and XD receive trigger pulses when pulse distribution for one cutting block or workpiece is finished and serve to reverse the flip-flop DIS. A pair of gates G7 and G8 distribute the output pulses to terminals X and Y.

The cycle counter CN of FIG. 27 is shown in FIG. 52 and its operation is disclosed in FIG. 53.

In FIG. 29, the input control section or unit of the control circuit CoC comprises a beat counter BCO, a register selector RSE, output gates 29G1 to 29G8, a gate BG and a flip-flop BC. The flip-flop BC receives a trigger pulse SPR from a sprocket hole and opens the gate BG. Each of the beat counter BCO and the register selector RSE comprises a two-stage binary counter having flip-flop circuits to control the output gates 29G1 to 29G8. The beat counter BCO counts the word pulses WP while the register selector RSE counts the S codes from the decoder DR.

The aforementioned word pulses WP are illustrated in a voltage diagram with respect to time in FIGS. 30a to 30g. Clock pulses or timing signals generally control the word pulses and serve as an input control and as an operation (calculation) control. Clock pulses of 200 kilocycles are produced by a crystal quartz oscillator (not shown). A five-stage binary counter divides the clock pulses by 32 and such divisions are combined by AND-gates or OR-gates so that the timing pulses or signals are generated as shown in FIG. 30b. FIG. 30a represents the voltage of the clock pulses relative to the horizontal time axis. FIG. 30b represents the voltage of the word pulses relative to a horizontal time axis. FIGS. 30c to g represent, respectively, a plus 1 voltage, a minus 1 voltage, a sign bit SB, a parity bit PB, and shift pulses SH, all relative to horizontal time axis. The signal SB of FIG. 30e is inserted, depending upon the sign of a number. That is, it is inserted in case a particular number is negative. PB of FIG. 30f is used so that an even number of pulses of the signal pass through the registers R1 to R5 for the calculating circuit CuC, as hereinafter discussed. In FIG. 30b, one word ranges from one WP pulse to the next WP pulse. Computation and other controls are conducted with this word pulse as the timing base. The input numbers from the tape reader start with +1 and come into the section of −1.

The calculating circuit CuC, together with the registers R1 to R5 and RI appear in the block diagram of FIG. 15. The calculating circuit CuC comprises a plurality of one-bit delays 1D1 to 1D8, a two-bit delay 2D, a complementer COMP connected to the two-bit delay, a full adder FA, and a plurality of gates GC6 to GC12 and OR-gates ORC1 to ORC4.

The one-bit delays 1D1 to 1D5 provide multiplication by 2 via a flip-flop circuit. The two-bit delay 2D serves to multiply by 4 in binary calculation. The complementer COMP serves to reverse signs. In binary computation of a definite number of digits with respect to a number X, $$X + \overline{X} = -1$$

Figure 16:
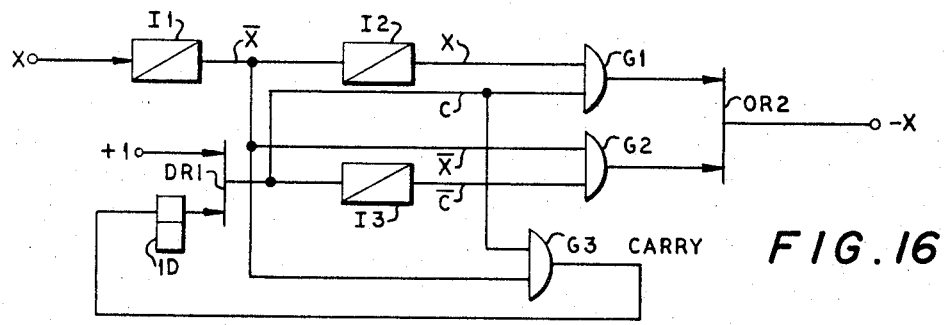
FIG. 16 is a block diagram of the complementer circuit of FIG. 15.

However, $\overline{X}$ is the reverse of a number X and therefore $-X = \overline{X} + 1$. A more detailed diagram of the complementer appears in FIG. 16. At the first digit +1 can overlap with "carry" since carry=zero.

Figure 17:
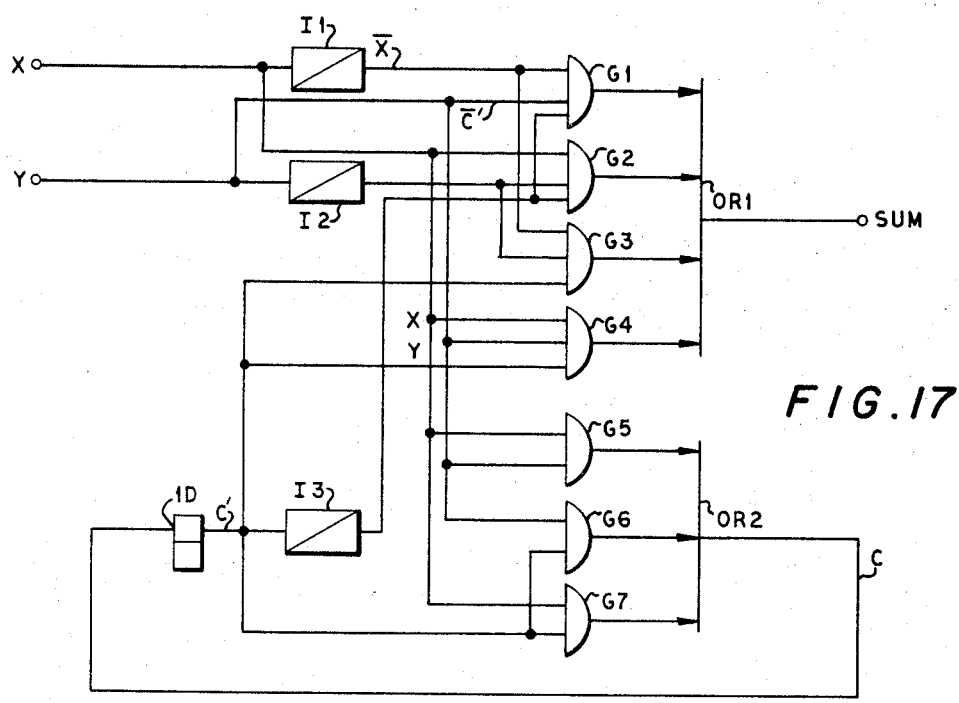
FIG. 17 is a block diagram of the full adder of FIG. 4.

The full adder of FIG. 15 is shown in FIG. 17 in more detail. In adding binary numbers X and Y digit by digit, C′ is the carry from the previous digit. SUM is the result of the adding and C is the carry to the next digit. FIG. 42 shows the relationship between these various operators. The circuit of FIG. 17 operates in accordance with the schedule of the table of FIG. 42.

Referring again to FIG. 15, a pair of parity check circuits RACH and RBCH receive signals from a parity check bit inserting circuit PB. Gates G1I to G4I serve as input gates for the registers R1 to R4. Gates G1A to G4A and G1B to G4B are output gates for registers R1 to R4. Gates G5 and $\overline{G5}$ are input and output gates for the register R5. The gates GC6 to GC12 serve to select the required type of calibration. A sign detector circuit SD discerns the sign of the calibration result depending upon whether the full adder has a sign bit or not. Details of the sign detector SD are described with reference to FIG. 27.

The registers R1 to R5 of FIGS. 4 and 15 include nickel delay lines or the like, as shown in FIG. 25, by way of schematic diagram. The principle of the register may be adduced from FIG. 26. Referring to FIG. 26, there is shown a nickel delay line in the form of a horizontal line. A writing coil WC surrounds the line at one end and a reading coil RC surrounds the line at the other end. An input passes to the writing coil by way of a writing amplifier WA and an output passes from the reading coil by way of the reading amplifier RA. When the writing coil carries pulse current, distortion is caused in the nickel delay line due to the magnetostrictive effect. The distortion is transmitted along the delay line DL. When the distortion reaches the leading coil RC, pulsive electromotive force is created due to a change in magnetic flux. The delay time required for such transmission depends upon the length of the line. This embodiment of the invention adopts the delay time of 160 microseconds. Therefore a pulse may be read 160 microseconds after it is written by means of the input.

The writing coil WC receives energy from the writing amplifier WA. The output of the reading coil passes from the reading amplifier into a pulse of the amplitude and waveform required. If, for example, the input terminal of the writing amplifier were connected to the output terminal of the reading amplifier and one pulse is passed to the writing amplifier from the a separate circuit, this pulse will circulate in 160 microseconds for each cycle between the delay line and the amplifier and will not disappear or degenerate unless it is cut off. That is, the pulse is stored. In accordance with this arrangement, the nickel delay line operates as a register or memory. The reading amplifier and the writing amplifier assume the form of transistorized DC amplifiers.

The delay time effected in the nickel delay line DL is influenced by external conditions. To synchronize the output of the reading amplifier RA with the clock pulses at the synchronizing circuit SCC shown in FIG. 25, a one-bit delay 1D, such as 1D1 to 1D4, is connected between the output and input of the delay line. The registers R1 to R4 store in numerical values, the coordinate values, Xs, Ys, Xe and Ye.

As shown in FIG. 5, pulse motors MX, MY and MZ serve as servo motors in the machine tool. The pulse motor comprises a stepping motor and a hydraulic power motor. We call such a motor an electro-hydraulic pulse motor.

The principle of a stepping motor is shown by the exemplary schematic diagram of FIG. 31. The poles of three phases A, B and C constitute the stator of the motor. Excitation of phase A creates the magnetic flux shown in the figure and stops the rotor at a position corresponding to the poles of the phase A. Excitation of the phase B causes the rotor to turn one step in the counterclockwise direction and to stop at the position where the poles of the rotor, which were previously between the phases B and C, face the stator pole of the phase B. With the phase C excited, the rotor turns another step. By sequential excitation in the order of A, B, C, A, B, C . . . , the rotor turns step by step in the counterclockwise direction. The rotor turns in the reverse direction when the poles are excited in the order of A, C, B, A, C, B . . . The motor, as shown in FIG. 31, is called the stepping motor of 12 poles in that 12 steps may constitute one rotation of the rotor. In a practical embodiment of the present invention we employ a stepping motor of 120 pole type to improve response characteristics.

Control of the individual stepping motor is effected in accordance with the block diagram of FIG. 32. The X, Y and Z signals are applied to corresponding ternary ring counters CX, CY and CZ. Amplifiers VX, VY and VZ pass the signals from the ring counters to stepping motors MX, MY, MZ. The ring counters CX, CY and CZ divide input pulses to the individual terminals A, B and C. For instance, +X pulses are divided to the input terminals A, B and C of the stepping motor MX by the counter CX in the order A, B, C, A, B, C, while −X pulses are provided in another order A, C, B, A, C, B, since the rotors of the motors MX, MY and MZ rotate step by step in counterclockwise or clockwise direction in accordance with the schedule to which terminal the input pulses are supplied. The stepping motor is only for the purpose of operating the pilot valve of the hydraulic power motor, and the hydraulic motor generates torque for moving the table of the machine tool in FIG. 5.

Figure 33:
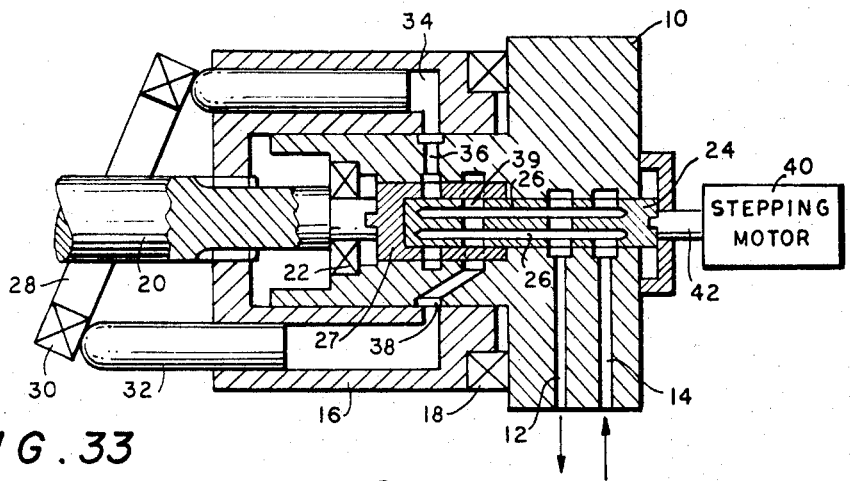
FIG. 33 is a side view, partly in section, of a hydraulic motor whose pilot valve is operated by the stepping motor of FIG. 31, with an axial plunger type hydraulic drive and with a fixed displacement swash plate.

FIG. 33 discloses the electrohydraulic pulse motor of FIG. 5 with an axial plunger-type hydraulic motor and fixed displacement swash plates. A fixed housing 10 is provided with oil pressure in its interior via supply channel 14 and a drainage channel 12. A coaxially rotatable piston housing 16 is mounted on the fixed housing 10 via bearing 18 and is keyed to an output shaft 20. A bearing 22 longitudinally restrains the output shaft 20 relative to the fixed housing 10. A pilot valve 24, coaxially mounted within the fixed housing 10 opposite the output axis, and for rotation across the oil pressure supply in the drainage channel 12 or the supply channel 14, carries a plurality of longitudinal flutes 26 and rotatingly projects into a sleeve 27 which is keyed to the shaft 20 and is surrounded by said housing. A swash plate 28, angularly affixed to the output shaft 20, presses, via a bearing 30, against a multitude of circularly positioned parallel coaxial pistons 32 slidably mounted in mating cylinder recesses 34 of the piston housing 16. The cylinder recesses form an oil pressure space 34 behind each of the pistons within the piston housing 16 and communicate by way of radial ducts 36, 38 and radial pilot valve ducts 39 with the flutes 26 of the piston valve 24. A stepping motor 40 includes an output shaft 42 keyed to the pilot valve for turning the pilot valve so as to cause communication between the incoming oil pressure supply and particular radial ducts in the housing. If the pressure in the duct of the sliding pistons 32 which are retracted into their cylinders increases, the force of the pistons pressing against the fixed swash plate rotates the piston housing 16 and the shaft 20 relative to the fixed housing 10.

Figure 35:
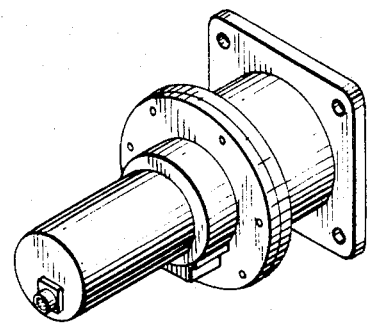
FIG. 35 is a perspective view of a hydraulic pulse motor utilized with the vertical milling machine and the circuit of FIG. 4.

As is well known, the pistons 32 are kept in the rotating housing for driving the output shaft, and a sleeve and pilot valve fit in the fixed housing for controlling the oil pressure. The sleeve connects with the output shaft and rotating housing. The pilot valve 24 connects with the input shaft in the stepping motor. Rotation of the hydraulic motor follows the turning of the pilot valve and its rotary angle is mechanically and directly fed back to the pilot valve. The hydraulic motor is in essence a closed loop analogue element. When the pilot valve is driven by the 120 pole type stepping motor, however, the output shaft of the hydraulic motor rotates by 3 degrees per pulse in accordance with the step of the stepping motor because of the good response which characterizes the hydraulic motor. A perspective view of the electrohydraulic pulse motor is shown in FIG. 35.

In the milling machine of FIG. 5 all movements along the X, Y, Z axes are effected by the table. A ball nut screw of especially high accuracy transforms the rotation torque of the pulse motor into translatory motion of the table. The table moves in a designated direction .1 millimeter for each step rotation of one of the pulse motors MX, MY and MZ.

Figure 34:
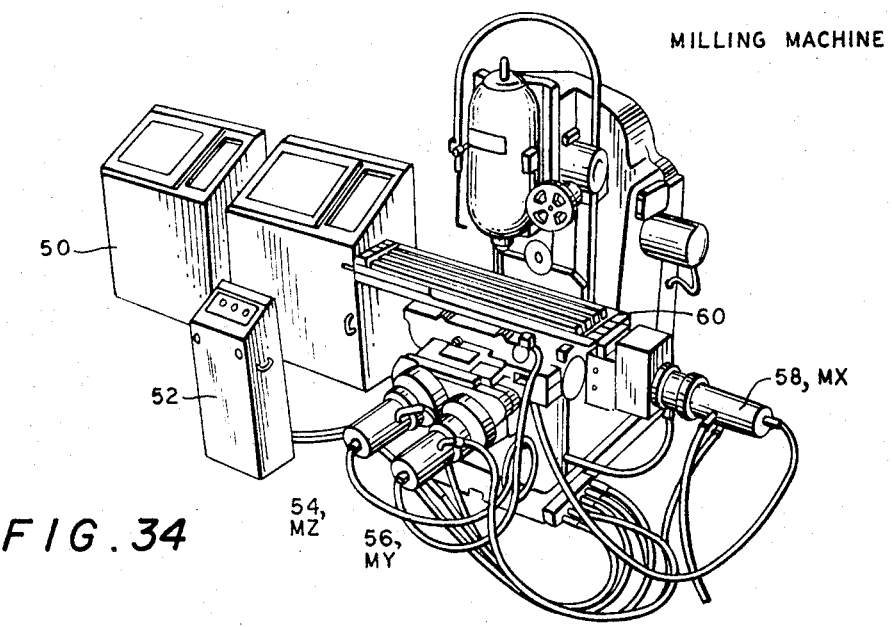
FIG. 34 is a perspective view of a vertical milling machine utilizing the numerical control equipment of FIG. 4.

FIG. 34 illustrates perspectively the milling machine of FIGS. 5 and 6, together with the controlling equipment 50 with operation panel 52. Pulse motors 54 and 56 and 58 combine to move the table 60 of the milling machine.

In operation, the control of the motors of the milling machine is effected as follows: First, the input codes stored in the input register RI are decoded. The input information read by the tape reader TR, after being stored in the input register RI, is sensed by decoder DR from the input register. When the input information is V or P code, the information sensed by TR is stored in the V or P registers RV or RP. Function indicator F code signals pass to the tape reader TR as in FIG. 13 and to the operation control section in the control unit CoC of FIG. 27. This stops the tape reader and initiates the calculating operation. N code issues into the input control section of control circuit CoC as in FIG. 29, and the numerical value stored in the input register carries into one of the registers R1 to R4. Registers R1 to R4 respectively store the numerical values $Xs$, $Ys$, $Xe$ and $Ye$ issued from the register RI. S code issues to the input control section, FIG. 29, of control circuit CoC and controls the register selector.

Transfer of the numerical values $Xs$, $Ys$, $Xe$ and $Ye$ from the input register RI to the registers R1 to R4 occurs as follows. Originally, all the numerical values, that is the coordinate values $Xs$, $Ys$, $Xe$ and $Ye$, passed to the tape reader in binary coded decimal form as shown in FIGS. 40a and 40b. Readout was accomplished digit by digit, starting with the most significant digit. (See FIG. 5.) Therefore, upon the readout of each unit, the digit read previously should be multiplied by 10 and added to the newly read digit. Thus, to select a register for storing $Xs$, $Ys$, $Xe$ and $Ye$, a switchover between the registers should be made each time an S code is read between the values of both coordinates. The switchover between the registers is accomplished by the register selector RSE in the input control section of the control circuit CoC, as shown in FIG. 29.

In FIG. 29, SPR indicates the output of the sprocket-hole reading amplifier of FIG. 8. S represents the S code decoded by the decoder DR. The occurrence of an SPR signal triggers the flip-flop BC. This results in the opening of the gate BG, and the word pulse WP enters the beat counter BC0. The beat counter BC0 comprises a two-stage binary counter having two flip-flops. At first, the beat counter BC0 assumes a state of initial set, or a state of $Bo$. When the gate BG is open, the beat counter counts word pulses WP. When four word pulses enter, the beat counter returns to the state of initial set, $Bo$. At such time, the flip-flop BC is reset and the gate BG closed. When the beat counter BC0 assumes, because of the input signals, a condition where an output is produced at B1, the digit previously read out is multiplied by 10. With an output at B2, the digit is added to the newly read digit. Generally, $10A = 2A + 8A$. 2A and 8A are respectively obtained by a one-bit delay and a three-bit delay. Register selector RSE, like the beat counter BC0, is a two-stage binary counter composed of two flip-flops. It advances once with each arrival of S code and sequentially transfers signals R1 to R4. The register selector RSE starts with an output at R1 at the initial reset position. The RS signal from FIG. 27 resets the register selector RSE upon the completion of calculation for each cutting block.

Transfer of numerical value and multiplication by 10 occur by virtue of the gate controlling in accordance with a predetermined schedule. The table of FIG. 44 illustrates the schedule of program for such operation. The gates which open and close in accordance with this program are shown in the table of FIG. 43.

In the input register RI as seen from FIG. 18, the input information is read in parallel. However, inside the registers R1 to R5, or in the calculation circuit CuC, the values are obtained in a serial form. This transformation occurs at the time of reading out values from the input register RI. The input register is constructed like a shift register (FIG. 36). Therefore, in case binary codes are stored in this register, if all flip-flops are triggered simultaneously by the shift signal SH as shown in FIG. 30, the state of such flip-flop shifts rightward one after another so that the contents of the register can be read out in a serial form through the output terminal at the extreme right. Shifting time is controlled by the opening and closing of the gate GS.

Pulse distribution and calculation (3—2) follow. At first, one pulse is provided in a decided direction, namely a ±Y or ±X pulse issues. The pulse-sending direction is determined in accordance with the result of a calculation which determines the present coordinate point. However, at the start of pulse distribution, the first pulse is sent out in a predetermined direction, for example, the X direction. Determination is then made as to whether the new present coordinate point lies in a minus area of a designated curve or not, that is, on the lower side of the curve. However, only one pulse issues at a time. Therefore, the new present coordinate values are calculated as the summation of X or Y coordinate value at the previous point at the numerical value plus 1 or minus 1. When an X pulse issues in the case of a straight line, for example, the new coordinate values X and Y are calculated as follows:

$$X_n = X_{n-1} + 1$$
$$Y_n = Y_{n-1}$$

where $X_{n-1}$ and $Y_{n-1}$ are the previous coordinate values.

In the case of a clockwise arc, the following holds:

$$X_n = X_{n-1} - 1$$
$$Y_n = Y_{n-1}$$

Calculation of whether the present point lies in the minus area of a designated curve or not is then performed. In the case of an arc, this calculation is performed on the basis of the Formulas (1) and (2), previously recited. That is, $$(Xs - X)^2 + (Ys + Y)^2 - r^2 \geq 0$$

$$(Xs - X)^2 + (Ys + Y)^2 - r^2 < 0 \quad (3-3)$$

therefore $$(Xn^2 + Yn^2) - (Xe^2 + Ye^2) \gtreqless 0$$

hence $$r^2 = Xe^2 + Ye^2$$

$$X = Xs - Xn$$

$$Y = Yn - Ys$$

In the case of a straight line, the following holds:

$$(Ys + Y) - (Ye/Xe)(Xs - X) \gtreqless 0$$

hence $$XeYn - XnYe \gtreqless 0$$

hence $Ye/Xe$ is a straight line with positive slope.

$$Y = Yn - Ys$$

$$X = Xn - Xs$$

A final calculation (3—4) determines whether the pulse distribution reaches its end point or not. That is, the difference between the end point and the present point is calculated. In practice, it is sufficient to calculate either the differences of values $Xe$ and $Xn$, or $Ye$ and $Yn$. When an X pulse is issued, for example, only the difference between $Xe$ and $Xn$ is calculated.

At each instant of provision of a feed pulse from the pulse generator PS to the control circuit CoC, one pulse is distributed at the X or Y terminal in the operation control section of FIG. 27 and the above-mentioned calculations are repeated. These calculations are achieved by controlilng the gates G1A to G4A, G7I to G4I, $\overline{G1I}$ to $\overline{G4I}$ and GC5 to GC12 (see FIG. 15). The latter are operated by means of the operation connection of control circuits CoC.

In FIG. 27, the F code decoded by the decoder DR triggers the flip-flop DIS and opens the gate GD. Then, the feed pulse coming from the pulse generator PS and selected by the V code from the decoder DR, passes and triggers the flip-flop C. Since the output of C opens the gate GC the word pulse WP passes GC and triggers the cycle counter CN. When flip-flop C triggers, one pulse is sent out to the X or Y terminal, according to the output of the register RE1 or RE2.

The cycle counter CN is set to produce an output at C0 in its initial state of rest. When a word pulse WP appears, it passes the gate GC and shifts the counter CN to the position of having an output C1. Then, according to the type of designated curve and the output of RE1, RE2, any of the terminals +LN1, −LN1, +A1 and −A1, receive a control signal which exercises the above-described calculation (3—3) of whether the new present point lies in the plus or minus area of the designated curve. The result of this calculation is stored in the register RE1, RE2. The designated curve is decoded by the decoder DR from the F code and passed to terminal A or LN.

The result of the calculation as to whether or not the new present point lies in the minus or plus area of the designated curve is picked up as the summation SUM in the full adder of FIG. 15. If summation SUM is a minus number, it will have a sign bit SB (see FIG. 30) and pass the gate G3. If SUM is a plus or zero, it will not have a sign bit and cannot pass the gate G3 while the inverse signal $\overline{SUM}$ of the summation SUM will have a sign bit pass the gate G4. In this way, the result of the last-mentioned calculation (3—3) concerning the position of the new present point can be stored in the register RE1, RE2.

When another word pulse is added, the counter CN is set to C2 and the control signal issues to any of the terminals +LN2, −LN2, +A2 and −A2, while the calculation (3—2) is accomplished. The third word pulse sets the counter CN at a setting wherein the output is at C3 and conducts the calculation (3—4) to determine whether pulse distribution gets to its end point.

The fourth word pulse WP resets the cycle counter CN at Co, inverting the flip-flop C and closing the gate GC. Meanwhile, the contents of register RE2, RE1 are transferred from one to the other. In this way, one cycle of operation required to issue one pulse in the X or Y direction is completed. Then the next feed pulse triggers, the flip-flop C again opens the gate GC and repeats the same one cycle operation.

When a present coordinate value $Xn$ or $Yn$ calculation (3—4) to determine whether pulse distribution gets to its end point coincides with the end value $Xe$ or $Ye$, the output signal of the Y-gate G1 or G2 triggers the register XD or YD. After pulse distribution for one cutting block is finished, both of the registers XD and YD are triggered and an output signal issues to the gate RS. This simultaneously inverts the flip-flop DIS and closes the gate GD. Since the state of counter CN remains unchanged even with the arrival of the next FP, the signal issued to the terminal RS starts the tape reader TR and the next series of information is read at TR (FIG. 13).

The output signals applied to the output terminals +LN1, +LN2 . . . A3 are applied for controlling the gates G1A to GC12 and GS (FIG. 15), individually, in the combination shown in the table of FIG. 45. As a result of these gate controls, pulse distribution and calculations are conducted as shown in the tables of FIGS. 46 and 47. In FIGS. 46 and 47, however, these calculations and pulse distributions are classified according to the states of cycle counter CN, the type of the designated curves and the result of the foregoing calculation whether the new present coordinate point lies in the minus or plus area of the designated curve ($D \geq 0$ or $D < 0$). FIGS. 46 and 47 are described hereinafter, in detail.

The result of the calculation (3—4) as to whether the pulse distribution has reached the end point or not is minus whenever the present coordinate value $Xn$ or $Yn$ does not coincide with the end value $Xe$ or $Ye$. As previously described, only numerical values of minus have a sign bit, so that if a SUM of the calculation (3—4) has no sign bit, it will be determined that SUM is not a minus value and that the present coordinate value $Xn$ or $Yn$ coincides with the end value $Xe$ or $Ye$. In practice, this results in the provision of both the inverse signal $\overline{SUM}$ of SUM and the sign bit SB to the gate G1 or G2.

The length of time required for a cycle of the counter CN corresponds to four-word pulses WP; that is, 160 times 4=640 microseconds. Since one cycle of the feed pulse is at least one microsecond for a rate of 1000 pulses per second, the counter CN completes one cycle prior to the arrival of the next FP. The output of the flip-flop C comprises pulses, each of which is about 640 microseconds in width, because it is produced at the rate of one per feed pulse FP. Consequently, the cutter in the machine tool is fed 0.01 millimeter in the X or Y direction by the pulse motor each time one feed pulse is supplied to the control unit CoC.

Figure 28:
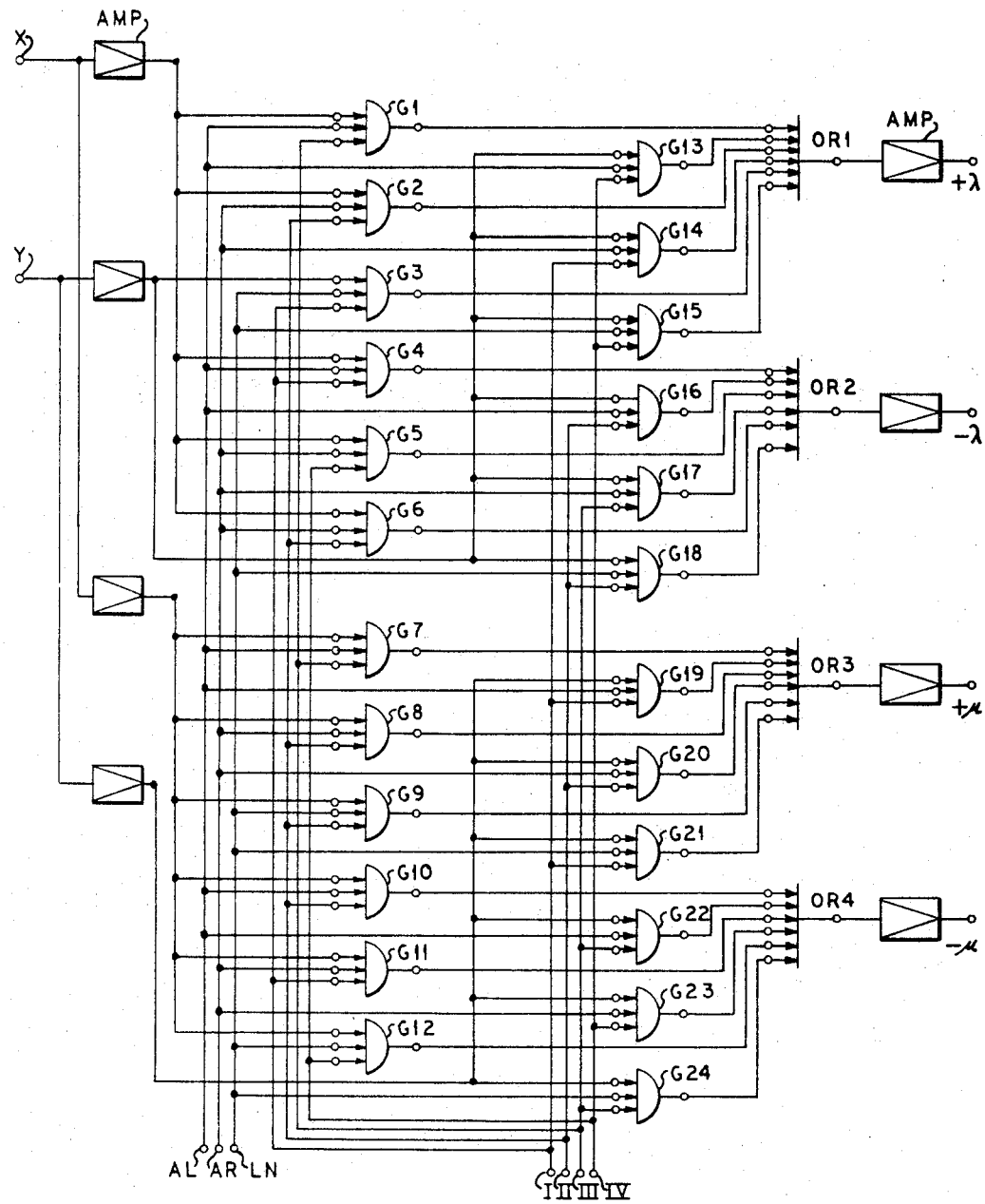
FIG. 28 is a circuit diagram of the gate circuit GI of FIG. 4.

The foregoing operations concern straight lines or counterclockwise arcs in the first quadrant. The following relates to pulse dividing at the gate circuit GI. All curves in the second, third and fourth quadrants must also be calculated. The pulse distribution for these curves is replaced by one for curves in the first quadrant by means of replacement of coordinate values as previously explained. In the same manner, distribution for clockwise arcs is replaced by one for counterclockwise arcs in the first quadrant. Replacement of the coordinate values is accomplished by the gate circuit GI. The gate group GI transforms X and Y pulses into $(+\lambda)$, $(-\lambda)$, $(+\mu)$, $(-\mu)$ direction, as shown in FIG. 28. In FIG. 28, signals AR, AL and LN are types of curves and signals I, II, III, and IV are quadrants in which the curves are located. These signals are decoded by the decoder DR from F code (FIG. 43). The relations between XY and $(\lambda)$, $(\mu)$ in the straight lines and arcs are shown in FIGS. 37, 38 and 39. If there is an output at GI, this means that sufficient signals may be obtained for control in a plane; for example, the XY plane.

FIG. 58 discloses a decoder which functions to decode the input signals AL, AR, LN, I, II, III and IV of FIG. 28 via an input register. Thus, if the F code signal is ALII, an output is provided at AND-gates G122 and G126. In such case, flip-flops F121, F122 and F123 are set and flip-flop F124 is reset. An output is provided, therefore, at AND-gates G129 and G133. The flip-flops F121 to F124 function to store the signals AL, AR, LN, I, II, III and IV, which signals are decoded by the AND-gates G121 to G128.

Relative to pulse dividing at the gate circuit GII, the output pulses of the gate circuit GI are further divided with regard to the X–Y, Y–Z and Z–X planes. This dividing is accomplished as shown in the table of FIG. 41 by the gate circuit GII of FIG. 24. In FIG. 24, the signals XY, YZ and ZX are plane designations stored in the P-register RP.

The table of the machine is driven by the supply of the output pulses $+X$, $-X$, $+Y$, $-Y$, $+Z$ and $-Z$ of the gate circuit G2 to the stepping motor control circuit of FIG. 32, and to the driving pulse motors MX, MY and MZ. The rotation of the motors MX, MY and MZ is converted into linear movements of the table through individual screws.

In addition to the previously described codes on the tape, the following on-off codes are utilized for special purposes. These codes, however, are supplied by the decoder DR to the machine tool or tape reader, so that their details are omitted.

(1) Starting the rotation of the cutter in the machine.
(2) Stopping the rotation of the cutter.
(3) Energizing the coolant pump.
(4) Deenergizing the coolant pump.
(5) Positioning the work on the table.
(6) Removing the work from the table.
(7) Rewinding the punch tape in the tape reader.
(8) Changing the cutter.

Figure 48:
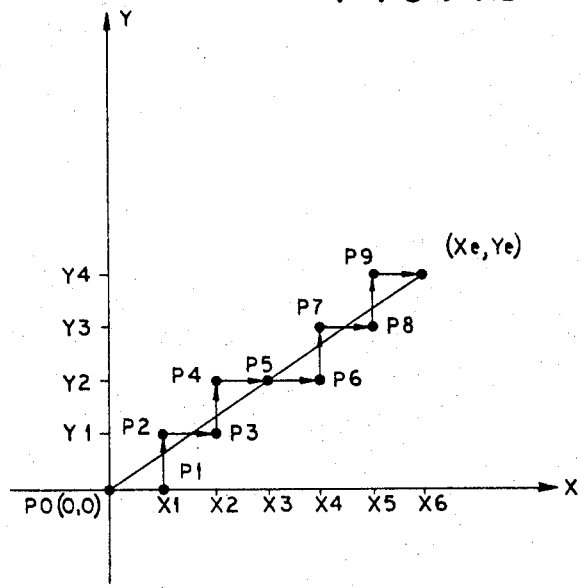
FIG. 48 is another graph explaining pulse distribution for the control of machinery along a straight line.
Figure 49:
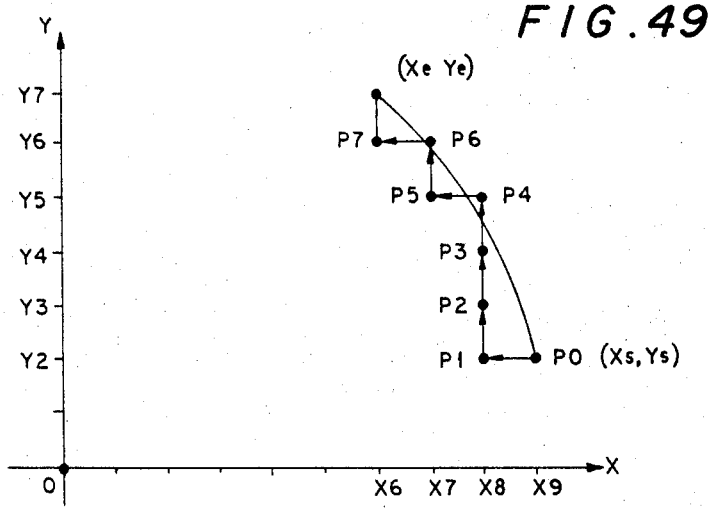
FIG. 49 is another graph explaining pulse distribution for the control of machinery along an arc.

The items listed in FIGS. 46 and 47 may be better understood upon analysis of FIGS. 48 and 49. In FIG. 48, the discriminant D is derived as $$D = XeY - YeX \quad (1)$$

The discriminant D is derived in the pulse distribution process in order to interpolate a straight line in the first quadrant, the straight line having a start point at the origin of the coordinate axes. In the discriminant, $Xe$ and $Ye$ represent the coordinate values of the end point of the line. When D is greater than or equal to zero, one pulse is generated in the $+X$ direction. In contrast, when D is less than zero, one pulse is generated in the $+Y$ direction.

If it is assumed that a point $Xi$, $Yj$ has been found in FIG. 48, the value of the discriminant D of Equation (1) is as follows $$Di, j = XeYj - YeXi$$

The discriminant D of the point $X_{i+1}$, $Yj$ may be determined in the $+X$ direction and the discriminant of the point $Xi$, $Y_{j+1}$ may be determined in the $+Y$ direction by utilizing the value of the discriminant $Di, j$ of Equation (2). The second point is spaced one pulse from the first point.

The discriminant D of the point $X_{i+1}$, $Yj$ is $D_{i+1}$, $$\begin{aligned} j &= XeYj - YeX_{i+1} \\ &= XeYj - Ye(X_{i+1}) \\ &= XeYj - YeXi - Ye \\ &= Di, j - Ye \end{aligned} \quad (3)$$

The foregoing may be interpreted to mean that the value $D_{i+1}, j$ of the point which is spaced one pulse from the previous point $Xi$, $Yj$ in the $+X$ direction, may be determined by substracting $Ye$ from the value of the discriminant D of the previous point. Similarly, the discriminant D of the point $Xi$, $Y_{j+1}$ is $Di$, $$\begin{aligned} j+1 &= XeY_{j+1} - YeXi \\ &= Xe(Y_{j+1}) - YeXi \\ &= XeYj - YeXi + Xe \\ &= Di, j + Xe \end{aligned} \quad (4)$$

The foregoing may be interpreted to mean that the value $Di, j+1$ of the point which is spaced one pulse from the previous point $Xi$, $Yj$ in the $+Y$ direction, may be determined by adding $Xe$.

FIG. 46 is concerned with a straight line. In such case, the value of the discriminant D in the early stage is zero. In the stage CO, one pulse is provided in the $+X$ direction. This term is indicated in FIG. 46 by line 2 of stage CO, as A FEED PULSE→X. Since one pulse is provided or issued in the $+X$ direction, the value of the discriminant D at the point P1 (X1, Y1) of FIG. 48 may be calculated by means of Equation (3). Such calculation is indicated in FIG. 46 in line 1 of the stage C1, as (R5)−(R4)→(R5). That is, in the register R5, the value of the discriminant at the previous point is stored, although the value of the discriminant in the early stage is zero, and the end point coordinate value $Ye$ is stored in the register R4. Thus, the discriminant of Equation 4 is determined by subtracting the value stored in the register R4 from the value stored in the register R5, and the resultant value of the discriminant is stored in the register R5. The sign of the resultant value of the discriminant is detected or determined by the sign detector and is stored in the sign register. This is indicated in line 2 of the stage C1 in FIG. 46.

In FIG. 46, the indication of stage C2, which is $(R1)+1 \rightarrow (R1)$, means that the contents of the register R1 are increased by one and the resultant sum is stored in the same register. The register R1 is utilized, for example, to store the coordinate value X of the machine tool or cutter at its actual position. As aforedescribed, one pulse is issued in the +X direction, so that the contents of the register R1 which were initially zero, are increased by one.

The indication of stage C3 of FIG. 46, which is $(R1)-(R3) \rightarrow (XD)$, means that the contents of the register R3 are subtracted from the contents of the register R1 and the sign register XD of FIG. 27 stores the sign of the result. That is, the sign register XD stores an indication of whether or not the difference or the result of the subtraction is negative. Since the register R3 stores the end point coordinate value Xe, the foregoing determines whether or not the pulse distribution has reached the end point.

The value of the discriminant D at a point of P1 in FIG. 48 is naturally negative and is stored in the sign register ±′ in the stage or cycle C1, as aforedescribed. In the stage or cycle C0, as indicated in line 1 of the stage C0 of the right hand column of FIG. 46, the sign stored in the sign register ±′ is transferred to the sign register ± and one pulse is issued or provided in the +Y direction, as shown in line 2 of the stage or cycle C0 of the right hand column of FIG. 46.

In the following cycle or stage C1, the discriminant of equation (4) is determined by the expression $(R5)+(R3) \rightarrow (R5)$, as indicated in line 1 of the cycle C1 of the right hand column of FIG. 46. That is, the contents of the register R5, which are the value of the discriminant D at the previous point, are increased by the contents of the register R3, which are the value of the coordinate X.

In the following cycle or stage C2, the contents of the register R2 are increased by one and the resultant sum is stored in the register R2, as indicated in the cycle C2 of the right hand column of FIG. 46. The contents of the register R2 are, for example, the coordinate value Y of the actual position of the machine tool or cutter.

In the following cycle or stage C3, the contents of the register R4 are subtracted from the contents of the register R2, as indicated in the cycle C3 of the right hand column of FIG. 46, and the sign, indicating whether the difference is negative or positive, is stored in the sign register YD.

FIG. 49 aids in explaining the case of an arc in the first quadrant, as listed in FIG. 47. In order to interpolate the arc, the discriminant D is determined as follows $$D = X^2 + Y^2 - (Xs^2 + Ys^2) \quad (5)$$

The value of the discriminant D at the points P0, P1, P2, P3, and so on, is set to the corresponding coordinates X9, Y2 X8, Y2 X8, Y3 X8, Y4, and so on. The discriminant D with the point $Xi, Yj$, in general, is determined as follows $$Di, J = Xi^2 + Yj^2 - (Xs^2 + Ys^2) \quad (6)$$

The new values of the discriminant $D_{i-1}, j$ for the point $X_{i-1}, Yj$, which is spaced one pulse from the previous point $Xi, Yj$ in the −X direction is then determined from the value of the discriminant $Di, j$, as is the value of the discriminant $Di, _{j+1}$ for the point $Xi, Y_{j+1}$ which is spaced one pulse from the previous point in the +Y direction. The value of the discriminant D of the point $X_{i-1}, Yj$ is $$\begin{aligned}
D_{i-1,j} &= (X_{i-1}^2 + Yj^2) - (Xs^2 + Ys^2) \\
&= [(Xi-1)^2 + Yj^2] - (Xs^2 + Ys^2) \\
&= (Xi^2 + Yj^2) - (Xs^2 + Ys^2) - 2Xi + 1 \\
&= Di, j - 2Xi + 1
\end{aligned} \quad (7)$$

Similarly, the value of the discriminant D of the point $Xi, Y_{j+1}$ may be determined as follows $$\begin{aligned}
Di, _{j+1} &= (Xi^2 + Y_{j+1}^2) - (Xs^2 + Ys^2) \\
&= [Xi^2 + (Y_{j+1})^2] - (Xs^2 + Ys^2) \\
&= (Xi^2 + Yj^2) - (Xs^2 + Ys^2) + 2Y_{j+1} \\
&= Di, j + 2Y_{j+1} + 1
\end{aligned} \quad (8)$$

The following conclusions may be derived from Equations (7) and (8). The value of the discriminant D for the point spaced one pulse in the −X direction may be determined by subtracting two times the X coordinate of the previous point from the discriminant value at the previous point and adding one to the result. Also, the value of the discriminant D of the point spaced one pulse in the +Y direction may be determined by adding two times the Y coordinate of the previous point and adding one to the value of the discriminant at the previous point.

As shown in line 1 of the cycle or stage C1 of FIG. 47, the term $(R5)-2(R1)+1 \rightarrow (R5)$ indicates the determination of the discriminant of Equation (7), and that of line 1 of the cycle C1 of the right hand column of FIG. 47, which is $(R5)+2(R2)+1 \rightarrow (R5)$, indicates the determination of the discriminant of Equation (8). The values of the discriminant D thus determined are stored in the register R5. In the cycle or stage C0, one pulse is issued or provided in the −X direction when D is greater than or equal to zero, as indicated in the left hand column of FIG. 47.

In the cycle or stage C1, the value of the discriminant of the point P1 (X8, Y2) of FIG. 49 is determined and the sign of the result is determined by the sign detector and is stored in the sign register ±′.

In the following cycle or stage C2, the coordinate value X of the actual position of the machine tool or cutter is corrected by subtracting one from the contents of the register R1 which stores the coordinate value X of the start point.

In the following cycle or stage C3, the difference between the coordinate value X of the actual position of the machine tool and the coordinate value X of the end point is determined and the sign of the result is stored in the sign register XD. That is, the contents of the register R1, which are the coordinate value of the actual position of the machine tool, are subtracted from the contents of the register R3, which are the coordinate value X of the end point. The sign register XD of FIG. 27 stores a signal which indicates whether the sign of the difference is positive or negative.

In the cycle or stage C0, the positive or negative sign of the discriminant D, which was previously determined to have been negative, is transferred from the sign register ±′ to the sign register ±, as indicated in line 1 of the cycle C0 of the right hand column of FIG. 47, and one pulse is issued or provided in the +Y direction, as indicated in line 2 of the cycle C0 of the right hand column of FIG. 47.

In the cycle or stage C1, the value of the discriminant D of the point P2 of FIG. 49 is determined by Equation (8). The result is stored in the register R5. The sign of the result is determined by the sign detector and is stored in the sign register ±.

In the cycle or stage C2, the contents of the register R2, which are the coordinate value of the start point, are increased by one to the coordinate value Y of the actual position of the machine tool or cutter.

In the cycle or stage C3, the difference between the coordinate values of the actual position and of the end point is determined and the sign of the result is determined and stored in the sign register YD. This may be utilized to determine whether the pulse distribution has reached the end point.

The interpolation to a straight line and arc in the first quadrant is completed by repetition of the foregoing determinations.

Every arc, regardless of whether it extends in clockwise or counterclockwise direction or whether it is in the second, third or fourth quadrant, must be replaced or must be repositioned by calculation in the first quadrant. Thus, for example, as indicated in Tables I and III, the counterclockwise arcs in the second and fourth quadrants and the clockwise arcs in the first and third quadrants are calculated with their ordinates replaced by their abscissas at their start points and with their ordinates being replaced by their abscissas at their end points. With regard to the arc processed by the circuit of FIG. 15, the registers R1, R2, R3 and R4 store the respective coordinate values $Xs$, $Ys$, $Xe$ and $Ye$. When the arc is counterclockwise in the first quadrant, the pulse is distributed by opening each gate G1A to G4A, G1B to G4B, G1I to G5I, and GC6 to GC12, in the combinations disclosed in FIG. 45, and in the manner hereinbefore described.

When the arc is counterclockwise and is located in the second or fourth quadrant, or is clockwise and is located in the first or third quadrant, the pulse is distributed, for example, by opening the gate G2A instead of the gate G1A (FIG. 15), as shown in FIG. 45, and by opening the gate G1A instead of the gate G2A. The combinations of the gates which require such switching are G1A and G2A, G1B and G2B, G3A and G4A, G3I and G4I, and G3B and G4B. When a straight line is located in the second or fourth quadrant, the gates must be switched in the aforedescribed manner.

The decoder readily determines whether the locus is that of a counterclockwise arc ALII or ALIV in the second or fourth quadrant, a clockwise arc ARI and ARIII in the first or third quadrant, or a straight line LNII or LNIV in the second or fourth quadrant. The following equations enable the decoder to indicate which arc or line is the proper locus $$ALII = I7 \text{ and } I6 \text{ and } I5 \text{ and } \overline{I2} \text{ and } I1$$
$$ALIV = I7 \text{ and } \overline{I6} \text{ and } I5 \text{ and } I2 \text{ and } I1$$
$$ARI = I7 \text{ and } I6 \text{ and } I5 \text{ and } I3 \text{ and } \overline{I2}$$
$$ARIII = I7 \text{ and } I5 \text{ and } I3 \text{ and } I2 \text{ and } \overline{I1}$$
$$LNII = I7 \text{ and } I5 \text{ and } I4 \text{ and } \overline{I2} \text{ and } I1$$
$$LNIV = I7 \text{ and } I6 \text{ and } I5 \text{ and } I4 \text{ and } I1$$

Figure 50:
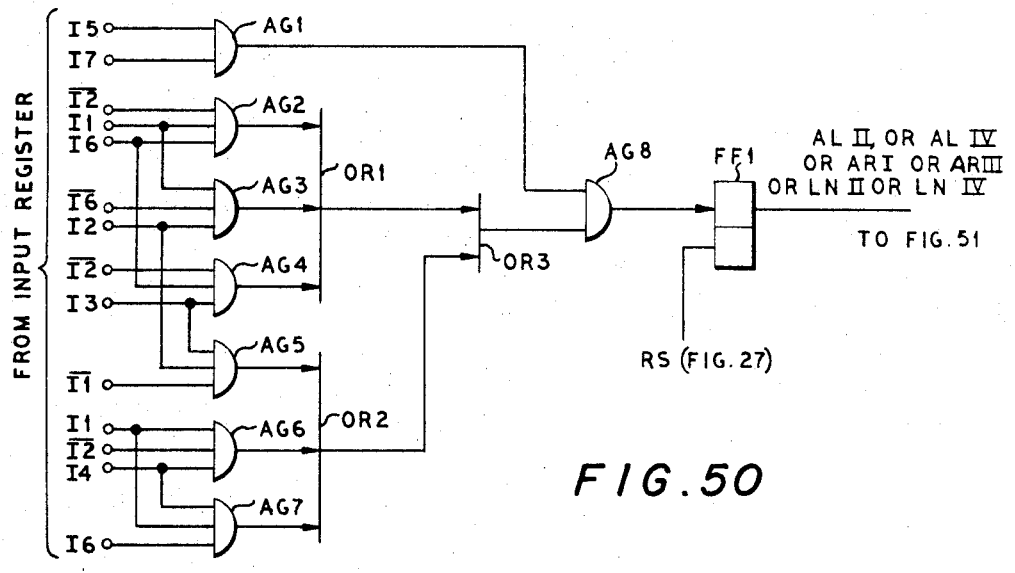
FIG. 50 is a circuit diagram of a decoder which may be utilized in the pulse distribution system of the present invention.

The decoder of FIG. 50 provides at the output of an AND-gate AG8 an indication of which of the arcs or lines ALII or ALIV, ARI or ARIII, or LNII or LNIV is the proper locus. The output of the AND-gate AG8 is then stored until a flip-flop FF1 is reset by the end signal RS provided by the circuit of FIG. 27.

Figure 51:
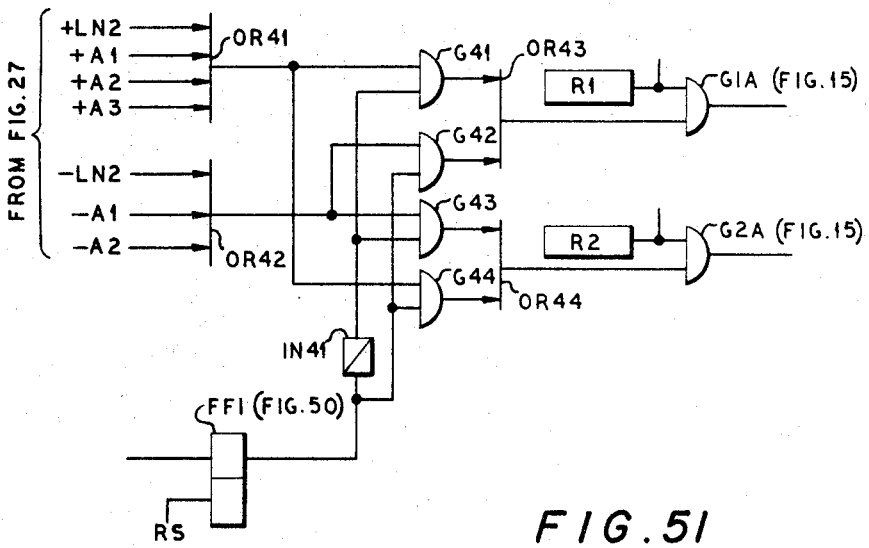
FIG. 51 is a circuit diagram of a switching circuit for switching the gate G1A to the gate G2A in FIG. 15.

FIG. 51 discloses a circuit which may be utilized to switch the gate G1A to the gate G2A (FIG. 15) as shown in FIG. 45. The circuit of FIG. 51 also switches the other gates G1B and G2B, G1I and G2I, and G3B and G4B, and G3I and G4I. In FIG. 51, if the F code is other than that indicating ALII, ALIV, ARI, ARIII, LNII or LNIV, the flip-flop FF1 is not set and its output is zero, so that the output of the inverter IN41 of FIG. 51 is 1. The AND-gates G41 and G43 of FIG. 51 are therefore opened and the output of the OR-gate OR41 opens and AND-gate G1A via the OR-gate OR43, and the output of the OR-gate OR42 opens and the AND-gate G2A via the OR-gate OR44. If the F code is for one of the arcs or lines ALII, ALIV, ARI, ARIII, LNII or LNIV, the flip-flop FF1 is set and the AND-gates G42 and G44 are opened. The output of the OR-gate OR41 then opens the AND-gate G2A via the OR-gate OR44, and the output of the OR-gate OR42 then opens the AND-gate G1A via the OR-gate OR43.

FIG. 52 discloses the circuit of the cycle counter CN of FIG. 27. The cycle counter of FIG. 52 comprises two flip-flops F51 and F52 which are in their zero condition when reset. That is, the terminals (a) and (c) are zero and the terminals (b) and (d) are 1 when the corresponding flip-flops are in their reset condition. Each time an AND-gate GC is opened and a word pulse WP is supplied to said AND-gate, the flip-flops F51 and F52 are switched to their conditions 1, 0, 0 1, 1 1, and 0 0. The outputs C0, C1, C2, and C3 of AND-gates G61 to G64 of FIG. 53 thus provide the waveforms illustrated in FIGS. 54a to 54e, as indicated. The outputs C0 to C3 of FIG. 53 correspond to the cycles or stages listed in FIGS. 46 and 47.

The sign bit pulse of FIG. 30e is supplied to the input SB of the two AND-gates G3 and G4 of the sign detector of FIG. 27. Thus, if there are any sums of the full adder FA of FIG. 15 when the sign bit pulse appears, the numerical value is negative. If there is no sum, the numerical value is positive. In the cycle or stage C1, when the numerical value provided by the full adder FA is positive, the AND-gate G3 is opened and the flip-flop register RE1 or $\pm'$ is set. The codes stored in the flip-flop register RE1 are then transferred to the flip-flop signal register RE2 or $\pm$ (FIG. 27) in the following cycle or stage.

Flip-flops and binary counters are disclosed in the book Switching Circuits, by Watts S. Humphrey, Jr., published by the McGraw-Hill Book Co., Inc., 1958. Monostable multivibrators and blocking oscillators are disclosed in Electronic and Radio Engineering Handbook by Frederick E. Terman, Fourth Edition, published by the McGraw-Hill Book Co. of New York in 1955.

While the invention has been described by means of specific examples and in specific embodiments, we do not wish to be limited thereto, for obvious modifications will occur to those skilled in the art without departing from the spirit and scope of the invention.

We claim:
1. Apparatus for controlling a device having feed controls by numerical pulses issued to the feed controls of the device in accordance with coordinates of a particular path to be followed during operation, said coordinates forming quadrants, said apparatus comprising motor means coupled to said device for moving said device in coordinate directions in response to pulses;

command means for commanding absolute values of the start and end point coordinates of the path to be followed and for providing a code indicating in which of the quadrants the path to be followed is located and for commanding the direction of movement of said device along said path, said command means comprising record media having said commands and code indications recorded therein;

readout means in operative proximity with said record media for reading out data recorded therein;

a plurality of registers connected to said readout means for storing the absolute values of said start and end point coordinates;

computer means connected to said plurality of registers for performing pulse distribution and computations based upon the contents of said plurality of registers;

control circuit means connected to said computer means for controlling the operation of said computer means;

replacing means connected with said plurality of registers for replacing the contents of said registers indicating the values of the coordinates of said start point and said end point with new coordinate values;

a register connected to one of said plurality of registers for storing the code indicating in which of the quadrants the path to be followed is located;

gate means connected to said control circuit means and said register for passing the distributed pulses provided by said computer means in accordance with the quadrant of location of said path to be followed and said direction along said path to be followed; and means coupling said gate means to said motor means for energizing said motor means in accordance with said distributed pulses.

2. Apparatus as claimed in claim 1, wherein said control circuit means actuates said computer means to determine if the actual position of said device is in a positive area relative to said path or in a negative area relative to said path and said computer means distributes pulses corresponding to the determination.

3. Apparatus as claimed in claim 1, wherein said replacing means replaces the values of the coordinates of the start and end points from any of the quadrants to the first quadrant.

4. Apparatus as claimed in claim 1, wherein said motor means comprises a pulse motor.

5. Apparatus as claimed in claim 1, wherein said motor means comprises a hydraulic motor coupled to said machine tool and an electric pulse motor driving said hydraulic motor and connected to said gate means.

6. Apparatus as claimed in claim 1, wherein said motor means comprises a hydraulic motor coupled to said machine tool and an electric pulse motor driving said hydraulic motor and connected to said gate means.

References Cited

UNITED STATES PATENTS 2,833,941  5/1958  Rosenberg et al. ____ 318—162 X

ORIS L. RADER, *Primary Examiner.*

THOMAS E. LYNCH, *Assistant Examiner.*

U.S. Cl. X.R.

318—18; 235—151.11